(12) United States Patent
Wang et al.

(10) Patent No.: US 12,422,649 B2
(45) Date of Patent: Sep. 23, 2025

(54) OPTICAL LENS ASSEMBLY AND IMAGING DEVICE INCLUDING FIVE LENSES OF −++−+, +++−+, −++−− OR −+−+− REFRACTIVE POWERS

(71) Applicant: NINGBO SUNNY AUTOMOTIVE OPTECH CO., LTD, Ningbo (CN)

(72) Inventors: Dongfang Wang, Ningbo (CN); Bo Yao, Ningbo (CN); Yafei Shi, Ningbo (CN)

(73) Assignee: NINGBO SUNNY AUTOMOTIVE OPTECH CO., LTD, Ningbo (CN)

( * ) Notice: Subject to any disclaimer, the term of this patent is extended or adjusted under 35 U.S.C. 154(b) by 665 days.

(21) Appl. No.: 17/493,175

(22) Filed: Oct. 4, 2021

(65) Prior Publication Data
US 2022/0026686 A1    Jan. 27, 2022

Related U.S. Application Data

(63) Continuation of application No. PCT/CN2020/083224, filed on Apr. 3, 2020.

(30) Foreign Application Priority Data

| Apr. 4, 2019 | (CN) | 201910271134.X |
| Jun. 27, 2019 | (CN) | 201910567420.0 |
| Sep. 2, 2019 | (CN) | 201910822855.5 |

(51) Int. Cl.
G02B 9/60 (2006.01)
G02B 13/00 (2006.01)

(52) U.S. Cl.
CPC ........... *G02B 13/0045* (2013.01); *G02B 9/60* (2013.01); *G02B 13/006* (2013.01)

(58) Field of Classification Search
CPC ..... G02B 13/0045; G02B 9/60; G02B 13/006
See application file for complete search history.

(56) References Cited

U.S. PATENT DOCUMENTS

| 2004/0257677 A1 | 12/2004 | Matsusaka |
| 2019/0041610 A1 | 2/2019 | Wu et al. |

FOREIGN PATENT DOCUMENTS

| CN | 1424613 A | 6/2003 |
| CN | 202230238 U | 5/2012 |

(Continued)

OTHER PUBLICATIONS

International Search Report in corresponding International Application No. PCT/CN2020/083224, mailed Jun. 30, 2020, 7 pgs.

(Continued)

*Primary Examiner* — Wen Huang
(74) *Attorney, Agent, or Firm* — HAUPTMAN HAM, LLP

(57) ABSTRACT

An optical lens assembly and an imaging device including the optical lens assembly are disclosed. The optical lens assembly, from an object side to an image side along an optical axis may sequentially include: a first lens, a second lens, a third lens, a fourth lens and a fifth lens. The first lens is of meniscus shape, at least one of surfaces of the second lens is a convex surface, one of the third and fourth lens has a positive refractive power, and the other has a negative refractive power, wherein the third lens and the fourth lens are cemented to form an cemented lens, at least one of surfaces of the fifth lens is a concave surface, and at least one of the first lens, second lens or the fifth lens has a positive refractive power.

20 Claims, 7 Drawing Sheets

(56) References Cited

FOREIGN PATENT DOCUMENTS

| | | |
|---|---|---|
| CN | 102621671 A | 8/2012 |
| CN | 102681144 A | 9/2012 |
| CN | 103376536 A | 10/2013 |
| CN | 203595856 U | 5/2014 |
| CN | 206161947 U | 5/2017 |
| CN | 206515544 U | 9/2017 |
| CN | 206848557 U | 1/2018 |
| CN | 108663771 A | 10/2018 |
| CN | 108663772 A | 10/2018 |
| CN | 108663774 A | 10/2018 |
| CN | 109324387 A | 2/2019 |
| CN | 109507782 A | 3/2019 |
| CN | 112147759 A | 12/2020 |
| JP | H1048514 A | 2/1998 |
| JP | H1184234 A | 3/1999 |
| JP | 2001318314 A | 11/2001 |
| JP | 2010008562 A | 1/2010 |
| KR | 20160013855 A | 2/2016 |
| WO | 2016062230 A1 | 4/2016 |

OTHER PUBLICATIONS

First Office Action in corresponding Chinese Application No. 201910271134.X, dated Apr. 13, 2021, 10 pgs.
Second Office Action in corresponding Chinese Application No. 201910271134.X, dated Sep. 1, 2021, 12 pgs.

OPTICAL LENS ASSEMBLY AND IMAGING DEVICE INCLUDING FIVE LENSES OF −++−+, +++−+, −++−− OR −+−+− REFRACTIVE POWERS

CROSS-REFERENCE TO RELATED APPLICATIONS

This application is a continuation of International Application No. PCT/CN2020/083224, filed on Apr. 3, 2020, which claims the priorities and benefit from Chinese Patent Application No. 201910271134.X, filed in the National Intellectual Property Administration (CNIPA) on Apr. 4, 2019, Chinese Patent Application No. 201910567420.0, filed in the CNIPA on Jun. 27, 2019, and Chinese Patent Application No. 201910822855.5, filed in the National Intellectual Property Administration (CNIPA) on Sep. 2, 2019. The aforementioned patent applications are hereby incorporated by reference in their entireties.

TECHNICAL FIELD

The present disclosure relates to an optical lens assembly and an imaging device including the optical lens assembly. More particularly, the present disclosure relates to an optical lens assembly including five or six lenses and an imaging device.

BACKGROUND

With the development and popularization of emerging technologies such as active driving or assisted driving, the market has increased demand for on-board lens assemblies, especially for lens assemblies with high imaging quality under harsh environments. On the one hand, the industry has higher and higher requirements for the resolution of the lens assembly. On the other hand, with the improvement of equipment integration and the limitation of installation position to the optical lens assembly for on-board applications, etc., the industry also requires the size of the lens assembly to be smaller and smaller. Ordinary small size lens assemblies have poor resolution. The traditional way to improve the resolution is to increase the number of lenses, but this will increase the cost and the size of the lens assembly, which is not conducive to the use of the lens assembly in a miniaturized integrated environment.

In addition, due to safety considerations, the optical lens assembly for on-board applications generally has stricter requirements on some aspects of optical parameters, especially the requirement on resolution performance of the optical lens assembly is higher and higher. With the increase in the pixels of on-board lens assembly cameras, chip sizes are also increasing. Therefore, the resolution capability of an on-board lens assembly used with the camera needs to be improved. In actual use, the requirement on peripheral brightness of the lens assembly is also relatively high.

Therefore, there is a need for a high-resolution optical lens assembly that can simultaneously satisfy the characteristics of miniaturization, large aperture, and high brightness.

SUMMARY

The present disclosure provides an optical lens assembly that is applicable to on-board installation and at least overcomes or partially overcomes at least one of the above deficiencies of the prior art.

In one aspect, the present disclosure provides an optical lens assembly, the optical lens assembly, from an object side to an image side along an optical axis may sequentially include: a first lens, a second lens, a third lens, a fourth lens and a fifth lens. The first lens may have positive refractive power or negative refractive power, an object-side surface of the first lens is a convex surface, and an image-side surface of the first lens is a concave surface; the second lens may have positive refractive power, an object-side surface and an image-side surface of the second lens are both convex surfaces; the third lens may have positive refractive power, an object-side surface and an image-side surface of the third lens are both convex surfaces; the fourth lens may have negative refractive power, an object-side surface and an image-side surface of the fourth lens are both concave surfaces; and the fifth lens may have positive refractive power, an object-side surface of the fifth lens is a convex surface, and an image-side surface of the fifth lens is a concave surface.

In an embodiment, the first lens may be an aspheric lens.

In an embodiment, the second lens may be an aspheric lens.

In an embodiment, the third lens and the fourth lens may be cemented to form a cemented lens.

In an embodiment, the optical lens assembly may further include an additional lens, the additional lens may have negative refractive power, an object-side surface of the additional lens is a convex surface, and an image-side surface of the additional lens is a concave surface.

In an embodiment, the additional lens may be arranged between the first lens and the second lens.

In an embodiment, a total track length TTL of the optical lens assembly and a total focal length value F of the optical lens assembly may satisfy: $TTL/F \leq 3$.

In an embodiment, an optical back focal length BFL of the optical lens assembly and a total length TL of the optical lens assembly may satisfy: $BFL/TL \geq 0.1$.

In an embodiment, a center spacing distance T23 between the second lens and the third lens on the optical axis and a total track length TTL of the optical lens assembly may satisfy: $T23/TTL \leq 0.01$.

In an embodiment, a distance T45 from the image-side surface of the fourth lens to the object-side surface of the fifth lens on the optical axis and a total track length TTL of the optical lens assembly may satisfy: $T45/TTL \leq 0.1$.

In an embodiment, a maximum field-of-view FOV of the optical lens assembly, a maximum effective aperture diameter D of the object-side surface of the first lens corresponding to the maximum field-of-view of the optical lens assembly, and an image height 2H corresponding to the maximum field-of-view of the optical lens assembly may satisfy: $D/2H/FOV \leq 0.06$.

In an embodiment, a focal length value F5 of the fifth lens and a total focal length value F of the optical lens assembly may satisfy: $F5/F \leq 4$.

In an embodiment, a center thickness $d_n$ (n=2, 3, 4, 5) of any lens from the second lens to the fifth lens and a center thickness $d_m$ (m=2, 3, 4, 5) of any lens from the second lens to the fifth lens may satisfy: $\max\{d_n/d_m\} \leq 3$.

In an embodiment, when the optical lens assembly includes five lenses, a center radius of curvature r1 of the object-side surface of the first lens, a center radius of curvature r2 of the image-side surface of the first lens, and a center thickness d1 of the first lens may satisfy: $0.5 \leq |(r2+d1)/r1| \leq 1.5$.

In an embodiment, a radius of curvature r2 of the image-side surface of the first lens and a radius of curvature r3 of the object-side surface of the additional lens may satisfy: $-0.15 \leq (r2-r3)/(r2+r3) \leq 1$.

In an embodiment, a center spacing distance T1x between the first lens and the additional lens on the optical axis and a center spacing distance T12 between the first lens and the second lens on the optical axis may satisfy: $0.01 \leq T1x/T12 \leq 0.15$.

In another aspect, the present disclosure provides an optical lens assembly, the optical lens assembly, from an object side to an image side along an optical axis may sequentially include: a first lens, a second lens, a third lens, a fourth lens and a fifth lens. The first lens may have positive refractive power or negative refractive power; the second lens, the third lens and the fifth lens each may have positive refractive power; the fourth lens may have negative refractive power; the third lens and the fourth lens may be cemented to form a cemented lens; and a total track length TTL of the optical lens assembly and a total focal length value F of the optical lens assembly may satisfy: $TTL/F \leq 3$.

In an embodiment, an object-side surface of the first lens may be a convex surface, and an image-side surface of the first lens may be a concave surface.

In an embodiment, an object-side surface and an image-side surface of the second lens may be both convex surfaces.

In an embodiment, an object-side surface and an image-side surface of the third lens may be both convex surfaces.

In an embodiment, an object-side surface and an image-side surface of the fourth lens may be both concave surfaces.

In an embodiment, an object-side surface of the fifth lens may be a convex surface, and an image-side surface of the fifth lens may be a concave surface.

In an embodiment, the optical lens assembly may further include an additional lens, the additional lens may have negative refractive power, an object-side surface of the additional lens is a convex surface, and an image-side surface of the additional lens is a concave surface.

In an embodiment, the additional lens may be arranged between the first lens and the second lens.

In an embodiment, the first lens may be an aspheric lens.

In an embodiment, the second lens may be an aspheric lens.

In an embodiment, an optical back focal length BFL of the optical lens assembly and a total length TL of the optical lens assembly may satisfy: $BFL/TL \geq 0.1$.

In an embodiment, a center spacing distance T23 between the second lens and the third lens on the optical axis and the total track length TTL of the optical lens assembly may satisfy: $T23/TTL \leq 0.01$.

In an embodiment, a distance T45 a distance from the image-side surface of the fourth lens to the object-side surface of the fifth lens on the optical axis and the total track length TTL of the optical lens assembly may satisfy: $T45/TTL \leq 0.1$.

In an embodiment, a maximum field-of-view FOV of the optical lens assembly, a maximum effective aperture diameter D of the object-side surface of the first lens corresponding to the maximum field-of-view of the optical lens assembly, and an image height 2H corresponding to the maximum field-of-view of the optical lens assembly may satisfy: $D/2H/FOV \leq 0.06$.

In an embodiment, a focal length value F5 of the fifth lens and the total focal length value F of the optical lens assembly may satisfy: $F5/F \leq 4$.

In an embodiment, a center thickness do (n=2, 3, 4, 5) of any lens from the second lens to the fifth lens and a center thickness dm (m=2, 3, 4, 5) of any lens from the second lens to the fifth lens may satisfy: $\max\{dn/dm\} \leq 3$.

In an embodiment, when the optical lens assembly includes five lenses, a center radius of curvature r1 of the object-side surface of the first lens, a center radius of curvature r2 of the image-side surface of the first lens, and a center thickness d1 of the first lens may satisfy: $0.5 \leq |(r2+d1)/r1| \leq 1.5$.

In an embodiment, a radius of curvature r2 of the image-side surface of the first lens and a radius of curvature r3 of the object-side surface of the additional lens may satisfy: $-0.15 \leq (r2-r3)/(r2+r3) \leq 1$.

In an embodiment, a center spacing T1x of the first lens and the additional lens on the optical axis and a center spacing T12 of the first lens and the second lens on the optical axis may satisfy: $0.01 \leq T1x/T12 \leq 0.15$.

In yet another aspect, the present disclosure provides an imaging device, and the imaging device may include the optical lens assembly according to the above embodiments and an imaging element for converting an optical image formed by the optical lens assembly into an electrical signal.

In yet another aspect, the present disclosure provides an optical lens assembly, the optical lens assembly, from an object side to an image side along an optical axis sequentially includes: a first lens, a second lens, a third lens, a fourth lens and a fifth lens. The first lens has negative refractive power; the second lens has positive refractive power, an object-side surface of the second lens is a convex surface, and an image-side surface of the second lens is a convex surface; the third lens has positive refractive power, an object-side surface of the third lens is a convex surface, and an image-side surface of the third lens is a convex surface; the fourth lens has negative refractive power, an object-side surface of the fourth lens is a concave surface, and an image-side surface of the fourth lens is a concave surface; and the fifth lens has refractive power.

In an embodiment, an object-side surface of the first lens is a convex surface, and an image-side surface of the first lens is a concave surface.

In an embodiment, an object-side surface of the first lens is a concave surface, and an image-side surface of the first lens is a convex surface.

In an embodiment, an object-side surface of the fifth lens is a convex surface, and an image-side surface of the fifth lens is a concave surface.

In an embodiment, an object-side surface of the fifth lens is a concave surface, and an image-side surface of the fifth lens is a convex surface.

In an embodiment, the third lens and the fourth lens are cemented to form a cemented lens.

In an embodiment, a diaphragm is arranged between the first lens and the second lens.

In an embodiment, at least one of the first lens, the second lens, and the fifth lens is an aspheric lens.

In an embodiment, each lens in the optical lens assembly is made of glass material.

In an embodiment, a total length TTL of the optical lens assembly and a total effective focal length F of the optical lens assembly satisfy: $TTL/F \leq 2.2$.

In an embodiment, a distance SL from the object-side surface of the second lens to an imaging plane of the optical lens assembly and a total length TTL of the optical lens assembly satisfy: $0.66 \leq SL/TTL \leq 1.24$.

In an embodiment, a center thickness CT2 of the second lens on the optical axis and a distance T12 from the image-side surface of the first lens to the object-side surface of the second lens on the optical axis satisfy: $CT2/T12 \leq 1.26$.

In an embodiment, an effective focal length F2 of the second lens and a total effective focal length F of the optical lens assembly satisfy: $0.5 \leq F2/F \leq 1.5$.

In an embodiment, an effective focal length F4 of the fourth lens and an effective focal length F3 of the third lens satisfy: $|F4/F3| \leq 2$.

In an embodiment, a total effective focal length F of the optical lens assembly and a combined focal length F34 of the third lens and the fourth lens satisfy: $|F/F34| \leq 1.5$.

In an embodiment, a sum of the center thicknesses $\Sigma CT$ of all lenses on the optical axis of the optical lens assembly and a total length TTL of the optical lens assembly satisfy: $\Sigma CT/TTL \leq 0.67$.

In an embodiment, an effective focal length F3 of the third lens and a total effective focal length F of the optical lens assembly satisfy: $0.1 \leq F3/F \leq 1.3$.

In an embodiment, a total length TTL of the optical lens assembly, an image height 2H corresponding to a maximum field-of-view of the optical lens assembly and the maximum field of-view FOV of the optical lens assembly satisfy: $TTL/2H/FOV \leq 0.30$.

In an embodiment, a maximum field-of-view FOV of the optical lens assembly, a total effective focal length F of the optical lens assembly and an image height 2H corresponding to the maximum field-of-view of the optical lens assembly satisfy: $(FOV \times F)/2H \leq 65$.

In an embodiment, a distance T23 from the image-side surface of the second lens to the object-side surface of the third lens on the optical axis and a total length TTL of the optical lens assembly satisfy: $T23/TTL \leq 0.03$.

In an embodiment, a total effective focal length F of the optical lens assembly and an image height 2H corresponding to a maximum field-of-view of the optical lens assembly satisfy: $F/2H \geq 1.5$.

In an embodiment, a distance DSR3 from the diaphragm to the second lens and a distance T12 from the image-side surface of the first lens to the object-side surface of the second lens on the optical axis satisfy: $DSR3/T12 \geq 0.42$.

In an embodiment, a distance BFL from the image-side surface of the fifth lens to an imaging plane of the optical lens assembly and a distance TL from the object-side surface of the first lens to the image-side surface of the fifth lens satisfy: $BFL/TL \geq 0.10$.

In an embodiment, a refractive index Nd2 of the second lens satisfies: $1.5 \leq Nd2$.

In an embodiment, a refractive index Nd3 of the third lens and a refractive index Nd4 of the fourth lens satisfy: $Nd3/Nd4 \leq 1.5$.

In an embodiment, an abbe number Vd4 of the fourth lens and an abbe number Vd3 of the third lens satisfy: $Vd4/Vd3 \leq 1.1$.

In yet another aspect, the present disclosure provides an optical lens assembly, the optical lens assembly, from an object side to an image side along an optical axis sequentially includes: a first lens, a second lens, a third lens, a fourth lens and a fifth lens. The first lens has negative refractive power; the second lens has positive refractive power; the third lens has positive refractive power; the fourth lens has negative refractive power; and the fifth lens has refractive power, where: a total length TTL of the optical lens assembly and a total effective focal length F of the optical lens assembly satisfy: $TTL/F \leq 2.2$.

In an embodiment, an object-side surface of the first lens is a convex surface, and an image-side surface of the first lens is a concave surface.

In an embodiment, an object-side surface of the first lens is a concave surface, and an image-side surface of the first lens is a convex surface.

In an embodiment, an object-side surface of the second lens is a convex surface, and an image-side surface of the second lens is a convex surface.

In an embodiment, an object-side surface of the third lens is a convex surface, and an image-side surface of the third lens is a convex surface.

In an embodiment, an object-side surface of the fourth lens is a concave surface, and an image-side surface of the fourth lens is a concave surface.

In an embodiment, an object-side surface of the fifth lens is a convex surface, and an image-side surface of the fifth lens is a concave surface.

In an embodiment, an object-side surface of the fifth lens is a concave surface, and an image-side surface of the fifth lens is a convex surface.

In an embodiment, the third lens and the fourth lens are cemented to form a cemented lens.

In an embodiment, a diaphragm is arranged between the first lens and the second lens.

In an embodiment, at least one of the first lens, the second lens, and the fifth lens is an aspheric lens.

In an embodiment, each lens in the optical lens assembly is made of glass material.

In an embodiment, a distance SL from the object-side surface of the second lens to an imaging plane of the optical lens assembly and a total length TTL of the optical lens assembly satisfy: $0.66 \leq SL/TTL \leq 1.24$.

In an embodiment, a center thickness CT2 of the second lens on the optical axis and a distance T12 from the image-side surface of the first lens to the object-side surface of the second lens on the optical axis satisfy: $CT2/T12 \leq 1.26$.

In an embodiment, an effective focal length F2 of the second lens and a total effective focal length F of the optical lens assembly satisfy: $0.5 \leq F2/F \leq 1.5$.

In an embodiment, an effective focal length F4 of the fourth lens and an effective focal length F3 of the third lens satisfy: $|F4/F3| \leq 2$.

In an embodiment, a total effective focal length F of the optical lens assembly and a combined focal length F34 of the third lens and the fourth lens satisfy: $|F/F34| \leq 1.5$.

In an embodiment, a sum of the center thicknesses $\Sigma CT$ of all lenses on the optical axis of the optical lens assembly and a total length TTL of the optical lens assembly satisfy: $\Sigma CT/TTL \leq 0.67$.

In an embodiment, an effective focal length F3 of the third lens and a total effective focal length F of the optical lens assembly satisfy: $0.1 \leq F3/F \leq 1.3$.

In an embodiment, a total length TTL of the optical lens assembly, an image height 2H corresponding to a maximum field-of-view of the optical lens assembly and the maximum field of-view FOV of the optical lens assembly satisfy: $TTL/2H/FOV \leq 0.30$.

In an embodiment, a maximum field-of-view FOV of the optical lens assembly, a total effective focal length F of the optical lens assembly and an image height 2H corresponding to the maximum field-of-view of the optical lens assembly satisfy: $(FOV \times F)/2H \leq 65$.

In an embodiment, a distance T23 from the image-side surface of the second lens to the object-side surface of the third lens on the optical axis and a total length TTL of the optical lens assembly satisfy: $T23/TTL \leq 0.03$.

In an embodiment, a total effective focal length F of the optical lens assembly and an image height 2H corresponding to a maximum field-of-view of the optical lens assembly satisfy: F/2H≥1.5.

In an embodiment, a distance DSR3 from the diaphragm to the second lens and a distance T12 from an image-side surface of the first lens to an object-side surface of the second lens on the optical axis satisfy: DSR3/T12≥0.42.

In an embodiment, a distance BFL from the image-side surface of the fifth lens to an imaging plane of the optical lens assembly and a distance TL from the object-side surface of the first lens to the image-side surface of the fifth lens satisfy: BFL/TL≥0.10.

In an embodiment, a refractive index Nd2 of the second lens satisfies: 1.5≤Nd2.

In an embodiment, a refractive index Nd3 of the third lens and a refractive index Nd4 of the fourth lens satisfy: Nd3/Nd4≤1.5.

In an embodiment, an abbe number Vd4 of the fourth lens and an abbe number Vd3 of the third lens satisfy: Vd4/Vd3≤1.1.

In yet another aspect, the present disclosure provides an electronic device, and the electronic device may include the optical lens assembly according to the above embodiments.

In yet another aspect, the present disclosure provides an optical lens assembly, the optical lens assembly, from an object side to an image side along an optical axis sequentially includes: a first lens, a second lens, a third lens, a fourth lens and a fifth lens. The first lens has negative refractive power, an object-side surface of the first lens is a concave surface, and an image-side surface of the first lens is a convex surface; the second lens has positive refractive powers; the third lens has refractive power; the fourth lens has refractive power; and the fifth lens has refractive power.

In an embodiment, the third lens and the fourth lens are cemented to form a cemented lens.

In an embodiment, an object-side surface of the second lens is a convex surface, and an image-side surface of the second lens is a convex surface.

In an embodiment, an object-side surface of the second lens is a concave surface, and an image-side surface of the second lens is a convex surface.

In an embodiment, an object-side surface of the third lens is a convex surface, and an image-side surface of the third lens is a convex surface.

In an embodiment, an object-side surface of the third lens is a concave surface, and an image-side surface of the third lens is a concave surface.

In an embodiment, an object-side surface of the fourth lens is a convex surface, and an image-side surface of the fourth lens is a convex surface.

In an embodiment, an object-side surface of the fourth lens is a concave surface, and an image-side surface of the fourth lens is a concave surface.

In an embodiment, an object-side surface of the fifth lens is a convex surface, and an image-side surface of the fifth lens is a concave surface.

In an embodiment, an object-side surface of the fifth lens is a concave surface, and an image-side surface of the fifth lens is a convex surface.

In an embodiment, an object-side surface of the fifth lens is a concave surface, and an image-side surface of the fifth lens is a concave surface.

In an embodiment, the first lens and the fifth lens are both aspheric lenses.

In an embodiment, a combined focal length F34 of the third lens and the fourth lens and a total effective focal length F of the optical lens assembly satisfy: 0.2≤|F34/F|≤6.8.

In an embodiment, a distance TTL from the object-side surface of the first lens to an imaging plane of the optical lens assembly on the optical axis and a total effective focal length F of the optical lens assembly satisfy: TTL/F≤3.

In an embodiment, a distance BFL from the image-side surface of the fifth lens to an imaging plane of the optical lens assembly on the optical axis and a distance TTL from the object-side surface of the first lens to the imaging plane of the optical lens assembly on the optical axis satisfy: BFL/TTL≥0.10.

In an embodiment, a maximum field-of-view FOV of the optical lens assembly, a maximum effective aperture diameter D of the object-side surface of the first lens corresponding to the maximum field-of-view FOV, and an image height 2H corresponding to the maximum field-of-view FOV satisfy: D/2H/FOV≤0.08.

In an embodiment, an effective focal length F3 of the third lens and an effective focal length F4 of the fourth lens satisfy: 0.6≤|F3/F4|≤2.2.

In an embodiment, an effective focal length F1 of the first lens and a total effective focal length F of the optical lens assembly satisfy: 4≤|F1/F|.

In an embodiment, a ratio of the center thicknesses of any two of the first lens to the fifth lens on the optical axis is not greater than 3.5.

In an embodiment, an effective focal length F1 of the first lens and an effective focal length F2 of the second lens satisfy: 4≤|F1/F2|.

In an embodiment, a radius of curvature R4 of the object-side surface of the second lens and a radius of curvature R5 of the image-side surface of the second lens satisfy: |(R4−R5)/(R4+R5)|≤8.5.

In an embodiment, a radius of curvature R1 of the object-side surface of the first lens and a radius of curvature R2 of the image-side surface of the first lens satisfy: 0.5≤|R1/R2|≤1.5.

In an embodiment, a spacing distance T12 between the first lens and the second lens on the optical axis and a distance TTL from the object-side surface of the first lens to an imaging plane of the optical lens assembly on the optical axis satisfy: 0.02≤T12/TTL≤0.33.

In an embodiment, a distance T45 from the image-side surface of the fourth lens to the object-side surface of the fifth lens on the optical axis and a distance TTL from the object-side surface of the first lens to an imaging plane of the optical lens assembly on the optical axis satisfy: 0.10≤T45/TTL≤0.60.

In yet another aspect, the present disclosure provides an optical lens assembly, the optical lens assembly, from an object side to an image side along an optical axis sequentially includes: a first lens, a second lens, a third lens, a fourth lens and a fifth lens. The first lens has negative refractive power; the second lens has positive refractive powers; the third lens has refractive power; the fourth lens has refractive power; and the fifth lens has refractive power, where: a distance TTL from an object-side surface of the first lens to an imaging plane of the optical lens assembly on the optical axis and a total effective focal length F of the optical lens assembly satisfy: TTL/F≤3.

In yet another aspect, the present disclosure provides an electronic device, and the electronic device may include the optical lens assembly according to the above embodiments and an imaging element for converting an optical image formed by the optical lens assembly into an electrical signal.

The present disclosure employs five lenses, and the optical lens assembly has at least one beneficial effect, such as high resolution, miniaturization, low cost, small Chief Ray Angle (CRA), and good temperature performance and the like, by optimizing the shape and the refractive power of each lens and the like.

BRIEF DESCRIPTION OF THE DRAWINGS

Other features, objects, and advantages of the present disclosure will become more apparent from the following detailed description of the non-limiting embodiments with reference to the accompanying drawings. In the drawings.

DETAILED DESCRIPTION OF EMBODIMENTS

Figure 1:
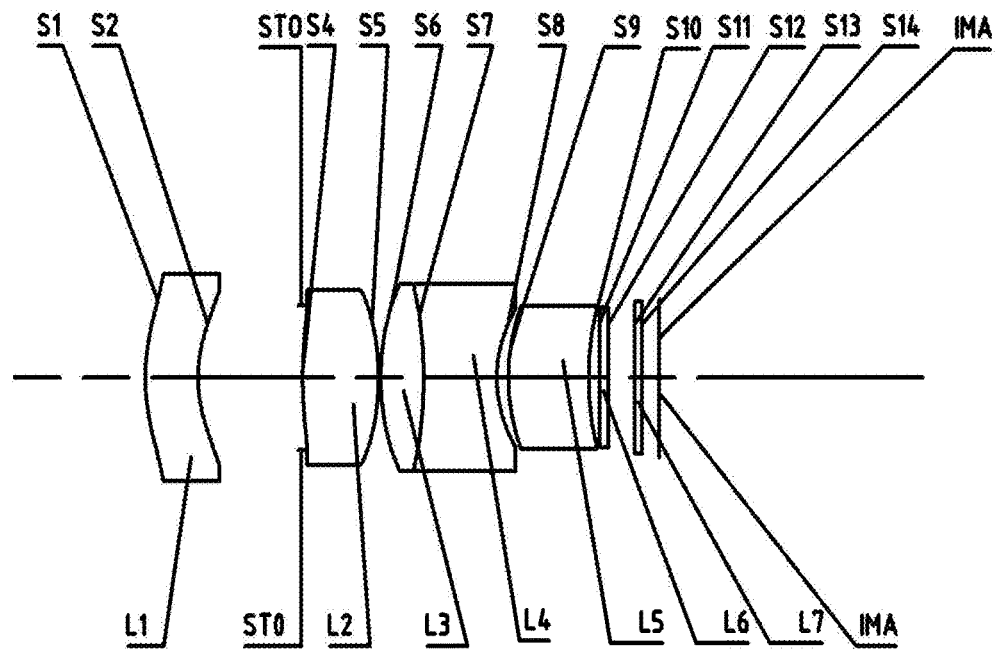
FIG. 1 illustrates a schematic structural view of an optical lens assembly according to embodiment 1 of the present disclosure.

For a better understanding of the present disclosure, various aspects of the present disclosure will be described in more detail with reference to the accompanying drawings. It should be understood that the detailed description is merely illustrative of the exemplary embodiments of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as first, second, third are used merely for distinguishing one feature from another, without indicating any limitation on the features. Thus, a first lens discussed below may also be referred to as a second lens or a third lens without departing from the teachings of the present disclosure.

In the accompanying drawings, the thickness, size and shape of the lens have been somewhat exaggerated for the convenience of explanation. In particular, shapes of spherical surfaces or aspheric surfaces shown in the accompanying drawings are shown by way of example. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

Herein, the paraxial region refers to a region near the optical axis. If a surface of a lens is convex and the position of the convex is not defined, it indicates that the surface of the lens is convex at least in the paraxial region; and if a surface of a lens is concave and the position of the concave is not defined, it indicates that the surface of the lens is concave at least in the paraxial region. In each lens, the surface closest to the object is referred to as an object-side surface of the lens, and the surface closest to the image side is referred to as an image-side surface of the lens.

It should be further understood that the terms "comprising," "including," "having," "containing" and/or "contain," when used in the specification, specify the presence of stated features, elements and/or components, but do not exclude the presence or addition of one or more other features, elements, components and/or combinations thereof. In addition, expressions, such as "at least one of," when preceding a list of features, modify the entire list of features rather than an individual element in the list. Further, the use of "may," when describing embodiments of the present disclosure, refers to "one or more embodiments of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It will be further understood that terms, such as those defined in commonly used dictionaries, should be interpreted as having a meaning that is consistent with the meaning in the context of the relevant art and will not be interpreted in an idealized or overly formal sense, unless expressly so defined herein.

It should also be noted that, the embodiments in the present disclosure and the features in the embodiments may be combined with each other on a non-conflict basis. Embodiments of the present disclosure will be described in detail below with reference to the accompanying drawings.

The features, principles, and other aspects of the present disclosure are described in detail below.

An optical lens assembly according to an exemplary embodiment of the present disclosure may include, for example, five lenses having refractive power, which are a first lens, a second lens, a third lens, a fourth lens and a fifth lens. The five lenses are arranged sequentially from an object side to an image side along an optical axis.

The optical lens assembly according to an exemplary embodiment of the present disclosure may further include a photosensitive element disposed on an imaging plane. Alternatively, the photosensitive element disposed on the imaging plane may be a Charge-Coupled Device element (CCD) or a Complementary Metal-Oxide Semiconductor element (CMOS).

The first lens may have positive refractive power or negative refractive power, and an object-side surface of the first lens may be a convex surface, and an image-side surface of the first lens may be a concave surface. The first lens may be set as a meniscus shape with the convex surface towards the object side, and the special shape setting of the first lens may facilitate collection of light and improving imaging quality. In practical applications, considering the outdoor installation and use environment of on-board lens assemblies, and they will be used in severe weather conditions such as rain or snow, the meniscus shape with the convex surface towards the object side is conducive to the dripping of water droplets, thereby reducing the influence on imaging.

The second lens may have positive refractive power, an object-side surface and an image-side surface of the second lens are both convex surfaces. The second lens is set as a positive lens, and an aspheric lens is chose for the second lens, to correct chromatic aberration of the first lens and improve the resolution capability, and at the same time to converge the light collected by the first lens and transmit converged light to rear lenses.

The third lens may have positive refractive power, an object-side surface and an image-side surface of the third lens may both be convex surfaces.

The fourth lens may have negative refractive power, an object-side surface and an image-side surface of the fourth lens may both be concave surfaces.

The fifth lens may have positive refractive power, an object-side surface of the fifth lens may be a convex surface, and an image-side surface of the fifth lens may be a concave surface. The fifth lens may further converge the light converged by the third lens, adjust the light, and make the light smoothly and steadily transmitted to the imaging plane.

In an exemplary embodiment, a diaphragm for restricting light beams may be arranged between, for example, the first lens and the second lens. When the diaphragm is arranged between the first lens and the second lens, the width of the incident light may be effectively contracted, to improve the brightness ratio between the periphery and the center. However, it should be noted that the position of the diaphragm arranged here is only an example and not a limitation; in an alternative embodiment, the diaphragm may also be arranged in other positions according to actual needs.

In an exemplary embodiment, the optical lens assembly may further include an additional lens, the additional lens may have negative refractive power, an object-side surface of the additional lens may be a convex surface, and an image-side surface of the additional lens may be a concave surface.

In an exemplary embodiment, the additional lens may be arranged between the first lens and the second lens.

In an exemplary embodiment, the optical lens assembly according to the present disclosure may further include an optical filter disposed between the fifth lens and the imaging plane, to filter lights having different wavelengths, as desired. Also, the optical lens assembly may further include a cover glass disposed between the optical filter and the imaging plane to prevent damage to an internal element (e.g., a chip) of the optical lens assembly.

As known to those skilled in the art, a cemented lens may be used to minimize or eliminate chromatic aberrations. The use of a cemented lens in an optical lens assembly can improve the image quality and reduce the reflection losses of light energy, thereby improving the sharpness of the image formed by the lens assembly. In addition, the use of a cemented lens may also simplify the assembly procedure in the lens assembly manufacturing process.

In an exemplary embodiment, the third lens and the fourth lens may be combined into a cemented lens by cementing the image-side surface of the third lens and the object-side surface of the fourth lens, in order to help improve the resolution, correct aberrations, and shorten the total track length TTL. In this cemented lens, the third lens arranged in the front has positive refractive power, and the fourth lens arranged in the rear has negative refractive power. This arrangement may further make the light passing through the first lens/second lens smoothly and steadily transmitted to the imaging plane, to reduce the total length of the system. In addition, the double cemented lens group itself may eliminate chromatic aberrations, reduce tolerance sensitivity, and may also leave some chromatic aberration to balance the chromatic aberration of the system.

In an exemplary embodiment, a total track length TTL of the optical lens assembly and a total focal length value F of the optical lens assembly may satisfy: $TTL/F \leq 3$, and more desirable, may further satisfy: $TTL/F \leq 2.5$. Satisfying the conditional expression $TTL/F \leq 3$, miniaturization characteristics may be ensured.

In an exemplary embodiment, an optical back focal length BFL of the optical lens assembly and a total length TL of the optical lens assembly may satisfy: $BFL/TL \geq 0.1$, and more desirable, may further satisfy: $BFL/TL \geq 0.12$. Satisfying the conditional expression $BFL/TL \geq 0.1$, the back focal length may be achieved on the basis of miniaturization, which is beneficial to the assembly of the optical lens assembly.

In an exemplary embodiment, a center spacing distance T23 between the second lens and the third lens on the optical axis and a total track length TTL of the optical lens assembly may satisfy: $T23/TTL \leq 0.01$, and more desirable, may further satisfy: $T23/TTL \leq 0.005$. Satisfying the conditional expression $T23/TTL \leq 0.01$ may make the structure of the optical lens assembly compact, and is beneficial to reduce the overall length of the lens assembly.

In an exemplary embodiment, a distance T45 from the image-side surface of the fourth lens to the object-side surface of the fifth lens on the optical axis and a total track length TTL of the optical lens assembly may satisfy: $T45/TTL \leq 0.1$, and more desirable, may further satisfy: $T45/TTL \leq 0.05$. Satisfying the conditional expression $T45/TTL \leq 0.01$ may make the structure of the optical lens assembly compact, and is beneficial to reduce the overall length of the lens assembly.

In an exemplary embodiment, the maximum field-of-view FOV of the optical lens assembly, the maximum effective aperture diameter D of the object-side surface of the first lens corresponding to the maximum field-of-view of the optical lens assembly, and an image height 2H corresponding to the maximum field-of-view of the optical lens assembly may satisfy: $D/2H/FOV \leq 0.06$, and more desirable, may further satisfy: $D/2H/FOV \leq 0.05$. Satisfying the conditional expression $D/2H/FOV \leq 0.06$ may realize the characteristics of small diameter at the front end.

In an exemplary embodiment, a focal length value F5 of the fifth lens and a total focal length value F of the optical lens assembly may satisfy: F5/F≤4, and more desirable, may further satisfy: F5/F≤3.8. The setting of the short focal length of the fifth lens helps to collect light and ensure the amount of light passing.

In an exemplary embodiment, a center thickness do (n=2, 3, 4, 5) of any of the second lens to the fifth lens and a center thickness dm (m=2, 3, 4, 5) of any of the second lens to the fifth lens may satisfy: max{dn/dm}≤3, and more desirable, may further satisfy: max{dn/dm}≤2.5. Based on this setting, the center thicknesses of the lenses in the second lens to the fifth lens are similar, it may contribute to small light deflection change of the overall optical lens assembly at high and low temperatures and thus good temperature performance.

In an exemplary embodiment, when the lens assembly includes five lenses, a center radius of curvature r1 of the object-side surface of the first lens, a center radius of curvature r2 of the image-side surface of the first lens, and a center thickness d1 of the first lens may satisfy: 0.5≤|(r2+d1)/r1|≤1.5, and more desirable, may further satisfy: 0.7≤|(r2+d1)/r1|≤1.2. The special shape design of the lens assembly may help to collect light and improve the imaging quality.

In an exemplary embodiment, a radius of curvature r2 of the image-side surface of the first lens and a radius of curvature r3 of the object-side surface of the additional lens may satisfy: −0.15≤(r2−r3)/(r2+r3)≤1, and more desirable, may further satisfy: −0.1≤(r2−r3)/(r2+r3)≤0.5. Satisfying the conditional expression −0.15≤(r2−r3)/(r2+r3)≤1 may correct aberrations of the optical system and ensure that when light emitted from the first lens is incident on a first surface (i.e., the object-side surface) of the additional lens, the incident light is relatively smooth, thereby reducing the tolerance sensitivity of the optical system.

In an exemplary embodiment, a center spacing distance T1x between the first lens and the additional lens on the optical axis and a center spacing distance T12 between the first lens and the second lens on the optical axis may satisfy: 0.01≤T1x/T12≤0.15, and more desirable, may further satisfy: 0.03≤T1x/T12≤0.12. By setting the distance between the additional lens and the first lens relatively close, light between the first lens and the second lens can be smoothly and steadily transitioned, and the resolution capability of the lens assembly may be further improved.

In an exemplary embodiment, an aperture number FNO of the optical lens assembly may satisfy: FNO≥2.0 to ensure the characteristics of large aperture.

In an exemplary embodiment, a peripheral illuminance REILL of the optical lens assembly may satisfy: REILL≥70%. By adopting an aspheric lens for the first lens, the incident angle of light may be increased, which is beneficial to improve the peripheral illuminance.

In an exemplary embodiment, the optical lens assembly according to the present disclosure may adopt spherical lenses or aspheric lenses. For example, the first lens and/or the second lens may be aspheric lenses to correct the aberrations of the system and improve the resolution. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. By adopting aspheric lens, the aberrations that occur during imaging may be eliminated as much as possible, and thus improving the imaging quality of the lens assembly. It should be understood that, in order to improve the imaging quality, the number of aspheric lenses in the optical lens assembly according to the present disclosure may also be increased.

In an exemplary embodiment, the optical lens assembly may employ a plastic lens or a glass lens. The coefficient of thermal expansion of the lens made of the plastic material is large, and when the ambient temperature of the lens assembly changes greatly, the plastic lens will cause a large change in the optical back focal length of the lens assembly. Using lenses made of glass material may reduce the effect on the optical back focal length of the lens assembly caused by temperature, but the cost is high.

The optical lens assembly according to the above embodiments of the present disclosure can achieve high resolution by using 5 or 6 lenses by rationally distributing the refractive power of each lens, the surface shape, the center thickness of each lens, and spaced intervals along the optical axis between the lenses, taking into account the requirements of small lens assembly size, low sensitivity, high production yield and low cost. At the same time, the optical lens assembly has the characteristics of long focal length, large aperture, high brightness, high imaging quality and the like. Therefore, the optical lens assembly according to the above embodiments of the present disclosure can have at least one of the beneficial effects of miniaturization, high resolution, large aperture, high brightness, etc., and may better meet the application requirements of, for example, an on-board lens assembly.

Those skilled in the art should understand that the total track length TTL of the optical lens assembly used above refers to an axial distance from the center of the object-side surface of the first lens to the center of the imaging plane; the optical back focal length BFL of the optical lens assembly refers to an axial distance from the center of the image-side surface of the last lens—the fifth lens to the center of the imaging plane; and the total length TL of the optical lens assembly refers to an axial distance from the center of the object-side surface of the first lens to the center of the image-side surface of the fifth lens of the last lens.

According to another aspect, the first lens may have negative refractive power and a meniscus shape, and the first lens may have a convex object-side surface and a concave image-side surface, or a concave object-side surface and a convex image-side surface. The refractive power and surface configuration of the first lens may reduce the incident angle of incident light on the incident surface, which is beneficial to collect more light into the optical system, thereby increasing the luminous flux and achieving higher imaging quality.

The second lens may have positive refractive power, an object-side surface of the second lens may be a convex surface and an image-side surface of the second lens may be a convex surface. The third lens may have positive refractive power, an object-side surface of the third lens may be a convex surface and an image-side surface of the third lens may be a convex surface. The second lens and the third lens in the optical lens assembly provided by the present disclosure are both biconvex lenses with positive refractive power, and both the object-side surfaces and the image-side surfaces are convex. The use of the biconvex lenses can compress the angle of incident light and realize smooth and steady transition of the light, which is beneficial to reduce the aperture of the rear lens, so that the light can enter the rear optical system correctly and smoothly, improving the resolution quality.

The fourth lens is a biconcave lens with negative refractive power, and both of the object-side surface and image-side surface are concave. In addition, the combination of the surface shapes and the refractive powers of the third lens and the fourth lens may effectively converge light incident on the front end to smoothly and steadily transit the light to the fifth lens, which is beneficial to reduce the aperture of the rear lens and increase the focal length of the lens assembly.

The fifth lens is a meniscus lens with refractive power, which may have a convex object-side surface and a concave image-side surface, or a concave object-side surface and a convex image-side surface. The fifth lens may correct the field curvature and astigmatism of the system and high-order aberrations of large-angle field of view.

According to an embodiment of the present disclosure, a diaphragm for restricting light beams is arranged between the first lens and the second lens to further improve the imaging quality of the optical lens assembly. When the diaphragm is arranged between the first lens and the second lens, the light beam entering the optical system may be narrowed and the aperture of the lens may be reduced. In an embodiment of the present disclosure, the diaphragm may be arranged near the image-side surface of the first lens. However, it should be noted that the position of the diaphragm arranged here is only an example and not a limitation; in an alternative embodiment, the diaphragm may also be arranged in other positions according to actual needs.

In an exemplary embodiment, the optical lens assembly according to the present disclosure may further include an optical filter disposed between the fifth lens and the imaging plane to filter lights of different wavelengths, as desired. Also, the optical lens assembly may further include a cover glass disposed between the optical filter and the imaging plane to prevent damage to an internal element (e.g., a chip) of the optical lens assembly.

As known to those skilled in the art, a cemented lens may be used to minimize or eliminate chromatic aberrations. The use of a cemented lens in an optical lens assembly can improve the image quality and reduce the reflection losses of light energy, thereby improving the sharpness of the image formed by the lens assembly. In addition, the use of a cemented lens may also simplify the assembly procedure in the lens assembly manufacturing process.

According to an embodiment of the present disclosure, the third lens and the fourth lens may be cemented to form a cemented lens. The third lens having positive refractive power is in front and the fourth lens having negative refractive power is in the back. Adopting the cementing method may have at least one of the following advantages: reducing the air space between the two lenses, thereby reducing the total length of the system; reducing the assembly parts between the third lens and the fourth lens, thereby reducing the process procedures and reducing the cost; reducing the tolerance sensitivity of the lens unit such as the tilt/eccentricity during the assembly process, and improving the production yield; reducing light loss caused by reflection between the lenses and increasing the illuminance; and further reducing the field curvature, and effectively correcting an off-axis point aberration of the optical lens assembly. Such a cemented design shares overall chromatic aberration correction of the system, effectively corrects aberrations to improve the resolution, and makes the optical system compact as a whole to meet the requirements of miniaturization.

According to an embodiment of the present disclosure, a total length TTL of the optical lens assembly and a total effective focal length F of the optical lens assembly satisfy: $TTL/F \le 2.2$, for example, $TTL/F \le 2.0$. Rationally controlling the proportional relationship between the total length of the optical lens assembly and the total effective focal length is conducive to ensuring the miniaturization of the system.

According to an embodiment of the present disclosure, a distance SL from the object-side surface of the second lens to an imaging plane of the optical lens assembly and a total length TTL of the optical lens assembly satisfy: $0.66 \le SL/TTL \le 1.24$, for example, $0.68 \le SL/TTL \le 1.22$. Rationally controlling the ratio relationship between the distance from the object-side surface of the second lens to the imaging plane of the optical lens assembly and the total length of the optical lens assembly in the optical lens assembly is beneficial to correct system distortion and coma and reduce the tolerance sensitivity of the system.

According to an embodiment of the present disclosure, a center thickness CT2 of the second lens on the optical axis and a distance T12 between the image-side surface of the first lens and the object-side surface of the second lens on the optical axis satisfy: $CT2/T12 \le 1.26$, for example, $CT2/T12 \le 1.22$. Rationally distributing the lens spacing distance is conducive to reducing the lens diameter and the volume of the lens assembly. It may effectively reduce the cost and realize the miniaturization of the system while improving the system resolution and the overall screen brightness.

According to an embodiment of the present disclosure, an effective focal length F2 of the second lens and a total effective focal length F of the optical lens assembly satisfy: $0.5 \le F2/F \le 1.5$, for example, $0.6 \le F2/F \le 1.0$. Rationally distributing the proportional relationship between the effective focal length of the second lens and the total effective focal length of the optical lens assembly may effectively improve the system resolution and reduce back focus drift of the optical lens assembly in high and low temperature environments.

According to an embodiment of the present disclosure, an effective focal length F4 of the fourth lens and an effective focal length F3 of the third lens satisfy: $|F4/F3| \le 2$, for example, $|F4/F3| \le 1$. Rationally distributing the focal lengths of the fourth lens and the third lens in the cemented lens, the focal length ratio is controlled within a reasonable range, which is beneficial to correct the chromatic aberration of the system and reduce the tolerance sensitivity of the lens assembly.

According to an embodiment of the present disclosure, a total effective focal length F of the optical lens assembly and a combined focal length F34 of the third lens and the fourth lens satisfy: $|F/F34| \le 1.5$, for example, $|F/F34| \le 1.2$. Rationally controlling the proportional relationship between the total effective focal length of the optical lens assembly and the combined focal length of the third lens and the fourth lens is conducive to reducing the overall length of the system.

According to an embodiment of the present disclosure, a sum of the center thicknesses $\Sigma CT$ of all lenses on the optical axis of the optical lens assembly and a total length TTL of the optical lens assembly satisfy: $\Sigma CT/TTL \le 0.67$, for example, $\Sigma CT/TTL \le 0.65$. It is beneficial to improve the effective utilization of the lenses by rationally setting the center thickness of each lens in the optical lens assembly, and controlling the ratio of the sum of the center thicknesses of all lenses to the total length of the optical lens assembly within a reasonable numerical range.

According to an embodiment of the present disclosure, an effective focal length F3 of the third lens and a total effective focal length F of the optical lens assembly satisfy: $0.1 \le F3/F \le 1.3$, for example, $0.2 \le F3/F \le 1.2$. It is beneficial to improve the system resolution and realize the miniaturization of the optical lens assembly by controlling the ratio of the effective focal length of the third lens to the total effective focal length of the optical lens assembly within a reasonable numerical range.

According to an embodiment of the present disclosure, the total length TTL of the optical lens assembly, an image height 2H corresponding to a maximum field-of-view of the optical lens assembly, and the maximum field-of-view FOV of the optical lens assembly satisfy: TTL/2H/FOV≤0.30, for example, TTL/2H/FOV≤0.20. Rationally setting the interrelationship among the above three makes it easy to realize the miniaturization of the optical lens assembly.

According to an embodiment of the present disclosure, the maximum field-of-view FOV of the optical lens assembly, a total effective focal length F of the optical lens assembly and an image height 2H corresponding to the maximum field-of-view of the optical lens assembly satisfy: (FOV×F)/2H≤65, for example, (FOV×F)/2H≤60. Rationally setting the interrelationship among the above three makes it easy to reduce system distortion.

According to an embodiment of the present disclosure, the distance T23 from the image-side surface of the second lens to the object-side surface of the third lens on the optical axis and a total length TTL of the optical lens assembly satisfy: T23/TTL≤0.03, for example, T23/TTL≤0.005. Rationally controlling the proportional relationship between the distance from the image-side surface of the second lens to the object-side surface of the third lens on the optical axis and the total length of the optical lens assembly is beneficial to reduce the lens diameter, reduce the volume of the lens assembly, and improve the system resolution and the overall screen brightness, at the same time may effectively reduce the cost and realize the miniaturization of the system.

According to an embodiment of the present disclosure, the total effective focal length F of the optical lens assembly and the image height 2H corresponding to a maximum field-of-view of the optical lens assembly satisfy: F/2H≥1.5, for example, F/2H≥1.6. Rationally increasing the focal length of the lens may help the system to form clear image of distant objects.

According to an embodiment of the present disclosure, a distance DSR3 from the diaphragm to the second lens and a distance T12 from an image-side surface of the first lens to an object-side surface of the second lens on the optical axis satisfy: DSR3/T12≥0.42, for example, DSR3/T12≥0.44. Rationally setting the interrelationship between the two is beneficial to improve the system resolution, and makes it easy to realize the miniaturization of the optical lens assembly.

According to an embodiment of the present disclosure, a distance BFL from the image-side surface of the fifth lens to an imaging plane of the optical lens assembly and a distance TL from the object-side surface of the first lens to the image-side surface of the fifth lens satisfy: BFL/TL≥0.10, for example, BFL/TL≥0.12. Rationally controlling the proportional relationship between the back focal length of the optical lens assembly and the total length of the optical lens assembly is beneficial to the assembly of the modules on the basis of realizing the miniaturization of the system. Here, the back focal length of the optical lens assembly is BFL; and the total length of the optical lens assembly is TL.

According to an embodiment of the present disclosure, a refractive index Nd2 of the second lens satisfies: 1.5≤Nd2, for example, 1.55≤Nd2. Rationally setting the refractive index of the second lens is conducive to reducing lens aperture, improving the imaging quality, reducing the system tolerance sensitivity, improving the production yield, and reducing the production cost.

According to an embodiment of the present disclosure, a refractive index Nd3 of the third lens and a refractive index Nd4 of the fourth lens satisfy: Nd3/Nd4≤1.5, for example, Nd3/Nd4≤1.2. Rationally setting the proportional relationship between the refractive index of the third lens and the refractive index of the fourth lens in the cemented lens is beneficial to correct the chromatic aberration of the system, control the light direction, and reduce the rear port diameter of the lens assembly.

According to an embodiment of the present disclosure, an abbe number Vd4 of the fourth lens and an abbe number Vd3 of the third lens satisfy: Vd4/Vd3≤1.1, for example, Vd4/Vd3≤0.8. Rationally setting the proportional relationship between the abbe number of the fourth lens and the abbe number of the third lens in the cemented lens is beneficial to correct an axial chromatic aberration and a vertical chromatic aberration of the optical lens assembly and improve the resolution quality.

According to an embodiment of the present disclosure, at least one of the first lens, the second lens, and the fifth lens is an aspheric lens. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the imaging quality of the lens assembly. For example, the use of an aspheric lens for the first lens may further improve the resolution quality. In addition, the first lens, the second lens, and the fifth lens may all adopt aspheric lenses. This helps correct the aberration of the system and improve the resolution.

According to an embodiment of the present disclosure, each lens in the optical lens assembly is made of glass material. The coefficient of thermal expansion of the lens made of the plastic material is large, and when the ambient temperature of the lens assembly changes greatly, the plastic lens will cause a large change in the optical back focal length of the lens assembly. Using lenses made of glass material may reduce the effect on the optical back focal length of the lens assembly caused by temperature. In addition, the use of glass lenses may ensure the stability of the optical performance at different temperatures.

By optimally setting the shapes of the lenses, rationally distributing the refractive powers and rationally selecting the lens material, the optical lens assembly according to the above embodiments of the present disclosure may achieve high resolution (above 8 M) using a 5-piece structure. At the same time, the optical lens assembly may meet the requirements of miniaturization, low sensitivity, high production yield, and low cost. The optical lens assembly has a small CRA to avoid stray light caused by light emitted from the rear end of the lens and irradiated on the lens barrel, and to well match chip such as on-board chip without color cast and dark corners. The optical lens assembly has good temperature performance, small changes in imaging effects at high or low temperature, stable image quality, and can be applied to most environments where vehicles are used. Therefore, the optical lens assembly according to the above embodiments of the present disclosure may better meet the requirements of, for example, on-board applications.

According to yet another aspect, the first lens has negative refractive power, an object-side surface of the first lens is a concave surface and an image-side surface of the first lens is a convex surface; the second lens has positive refractive power; the third lens has refractive power; the fourth lens has refractive power; and the fifth lens has refractive power. In this way, the imaging quality of the optical lens assembly may be improved by rationally configuring the refractive power and the surface shape of each lens.

The first lens may have negative refractive power and a meniscus shape, the object-side surface of the first lens may be a concave surface, and the image-side surface of the first lens may be a convex surface. The refractive power and surface configuration of the first lens is not only conducive to light entering the rear optical system smoothly improving the resolution of the lens assembly, but also conducive to the optical system to collect incident light from large field of view, ensuring that as much light enters as possible, thereby increasing the luminous flux, enhancing the illuminance.

The second lens may have positive refractive power, an object-side surface and an image-side surface of the second lens may be both convex surfaces, or an object-side surface of the second lens may be a concave surface, and an image-side surface of the second lens may be a convex surface. According to an embodiment of the present disclosure, a diaphragm may be arranged between the first lens and the second lens. The second lens having positive refractive power may be arranged behind the diaphragm and cooperate with the diaphragm to facilitate light convergence, reduce the diameter and length of the optical lens barrel, and realize miniaturization of the lens assembly.

The third lens and the fourth lens may be arranged in cooperation. For example, the third lens may have positive refractive power, and an object-side surface and an image-side surface of the third lens may both be convex surfaces. At the same time, the fourth lens may have negative refractive power, and an object-side surface and an image-side surface of the fourth lens may both be concave surfaces. The third lens having positive refractive power is in front, and the fourth lens having negative refractive power is behind, which is beneficial to smoothly and steadily transmitting the light passing through the second lens to the fourth lens, reducing an overall length of the optical system.

As another example, the third lens may have negative refractive power, and an object-side surface and an image-side surface of the third lens may both be concave surfaces. At the same time, the fourth lens may have positive refractive power, and an object-side surface and an image-side surface of the fourth lens may both be convex surfaces. The third lens having negative refractive power is in front, and the fourth lens having positive refractive power is behind, which is beneficial to realize the effective convergence of front diverging light by the fourth lens.

The fifth lens may have positive refractive power or negative refractive power. When the fifth lens has positive refractive power, an object-side surface of the fifth lens may be a convex surface and an image-side surface of the fifth lens may be a concave surface, or an object-side surface of the fifth lens may be a concave surface and an image-side surface of the fifth lens may be a convex surface. When the fifth lens has negative refractive power, an object-side surface of the fifth lens may be a convex surface and an image-side surface of the fifth lens may be a concave surface, or an object-side surface and an image-side surface of the fifth lens may be concave surfaces at the same time. According to the different settings of the first lens to the fourth lens, the refractive power and surface shape of the fifth lens are selected so that the lenses are matched to improve the system resolution.

In an exemplary embodiment, a diaphragm for restricting light beams is arranged between the first lens and the second lens to further improve the imaging quality of the optical lens assembly. The diaphragm is conducive to effectively converging light entering the optical system, shortening the overall length of the system, and reducing the aperture of the lens. In an embodiment of the present disclosure, the diaphragm may be arranged near the image-side surface of the first lens or the diaphragm may be close to the image-side surface of the first lens. However, it should be noted that the position of the diaphragm is only an example and not a limitation; in an alternative embodiment, the diaphragm may also be arranged in other positions according to actual needs.

In an exemplary embodiment, the optical lens assembly according to the present disclosure may further include an optical filter disposed between the fifth lens and the imaging plane to filter lights of different wavelengths, as desired. Also, the optical lens assembly according to the present disclosure may further include a cover glass disposed between the fifth lens and the imaging plane to prevent damage to an internal element (e.g., a chip) of the optical lens assembly.

As known to those skilled in the art, a cemented lens may be used to minimize or eliminate chromatic aberrations. The use of a cemented lens in an optical lens assembly can improve the image quality and reduce the reflection losses of light energy, thereby improving the sharpness of the image formed by the lens assembly. In addition, the use of a cemented lens may also simplify the assembly procedure in the lens assembly manufacturing process.

In an exemplary embodiment, the third lens and the fourth lens are cemented to form a cemented lens. The third lens having positive refractive power is combined with the fourth lens having negative refractive power, or the third lens having negative refractive power is combined with the fourth lens having positive refractive power. The third lens and the fourth lens are cemented together, which may smoothly and steadily transit the light passing through the third lens to the imaging plane, reduce the overall length of the system, and correct various aberrations of the optical system, and improve the resolution of the lens assembly, Chief Ray Angle (CRA) and other optical performance under the premise of a compact system structure. The above cementing method between the lenses also has at least one of the following advantages: reducing its own chromatic aberration, reducing tolerance sensitivity, and balancing an overall chromatic aberration of the system through the remaining partial chromatic aberration; reducing the air space between the two lenses, thereby reducing the total length of the system; reducing the assembly parts between the lenses, thereby reducing the process procedures and reducing the cost; reducing the tolerance sensitivity of the lens unit due to the tilt/eccentricity during the assembly process, and improving the production yield; reducing light loss caused by reflection between the lenses and increasing the illuminance; and further reducing the field curvature, and effectively correcting an off-axis point aberration of the optical lens assembly. Such a cemented design shares overall chromatic aberration correction of the system, effectively corrects aberrations to improve the resolution, and makes the optical system compact as a whole to meet the requirements of miniaturization.

In an exemplary embodiment, a combined focal length F34 of the third lens and the fourth lens and a total effective focal length F of the optical lens assembly satisfy: $0.2 \leq |F34/F| \leq 6.8$, preferably, $0.5 \leq |F34/F| \leq 6.5$. Setting the value of the ratio of the combined focal length of the third lens and the fourth lens to the total effective focal length of the optical lens assembly within a reasonable numerical range may effectively control the combined focal length of the third lens and the fourth lens, which is beneficial for the optical system to achieve thermal compensation.

In an exemplary embodiment, a distance TTL from the object-side surface of the first lens to an imaging plane of the optical lens assembly on the optical axis and a total effective focal length F of the optical lens assembly satisfy: TTL/F≤3, preferably, TTL/F≤2.5. In the present disclosure, the distance from the object-side surface of the first lens to the imaging plane of the optical lens assembly on the optical axis is also referred to as the total length of the optical lens assembly. Rationally controlling the proportional relationship between the total length of the optical lens assembly and the total effective focal length is conducive to the miniaturization of the system.

In an exemplary embodiment, a distance BFL from the image-side surface of the fifth lens to the imaging plane of the optical lens assembly on the optical axis and a distance TTL from the object-side surface of the first lens to the imaging plane of the optical lens assembly on the optical axis satisfy: BFL/TTL≥0.10, preferably, BFL/TTL≥0.12. In the present disclosure, the distance from the image-side surface of the fifth lens to the imaging plane of the optical lens assembly on the optical axis is also referred to as the back focal length of the optical lens assembly. Rationally controlling the proportional relationship between the back focal length of the optical lens assembly and the total length of the optical lens assembly, may reduce the back focal length of the optical lens assembly, which is conducive to the assembly of the miniaturized module. Reducing the total length of the optical lens assembly, especially the length of the lens group, is conducive to a compact structure of the optical system, reducing the sensitivity of the lenses to a Modulation Transfer Function (MTF), improving the production yield, and reducing the production cost. The length of the lens group is the distance from the object-side surface of the first lens to the image-side surface of the fifth lens on the optical axis.

In an exemplary embodiment, a maximum field-of-view FOV of the optical lens assembly, a maximum effective aperture diameter D of the object-side surface of the first lens corresponding to the maximum field-of-view FOV, and an image height 2H corresponding to the maximum field-of-view FOV satisfy: D/2H/FOV≤0.08, preferably, D/2H/FOV≤0.10. Rationally setting the interrelationship among the above three makes it easy to reduce the front end diameter of the optical lens assembly and realize the miniaturization of the lens assembly.

In an exemplary embodiment, an effective focal length F3 of the third lens and an effective focal length F4 of the fourth lens satisfy: 0.6≤|F3/F4|≤2.2, preferably, 0.8≤|F3/F4|≤2.0. Rationally setting the proportional relationship between the effective focal length of the third lens and the effective focal length of the fourth lens in the cemented lens, so that the effective focal length of the third lens and the effective focal length of the fourth lens are similar, which is beneficial to the smooth and steady transition of light and corrects the chromatic aberration of the system.

In an exemplary embodiment, an effective focal length F1 of the first lens and a total effective focal length F of the optical lens assembly satisfy: 4≤|F1/F|, preferably, 5≤F1/F|. Rationally setting the proportional relationship between the effective focal length of the first lens and the total effective focal length of the optical lens assembly is beneficial for more light to enter the optical system smoothly and increase the system illuminance.

In an exemplary embodiment, a ratio of the center thicknesses of any two of the first lens to the fifth lens on the optical axis is not greater than 3.5. Setting the maximum value of the ratio of the center thicknesses of any two lenses of the first lens to the fifth lens on the optical axis being less than or equal to 3.5, which is beneficial to uniform the center thickness of each lens, so that the function of each lens is stable, and the lens assembly has small light changes and good temperature performance in high and low temperature environments.

In an exemplary embodiment, an effective focal length F1 of the first lens and an effective focal length F2 of the second lens satisfy: 4≤|F1/F2|, preferably, 5≤|F1/F2|. Setting the ratio of the effective focal length of the first lens to the effective focal length of the second lens within a broad numerical range, leads a focal length difference between the first lens and the second lens to be large, which is beneficial for the optical system to concentrate light and improve the image quality.

In an exemplary embodiment, a radius of curvature R4 of the object-side surface of the second lens and a radius of curvature R5 of the image-side surface of the second lens satisfy: |(R4−R5)/(R4+R5)|≤8.5, preferably, |(R4−R5)/(R4+R5)|≤8. Rationally setting the relationship between the radius of curvature of the object-side surface of the second lens and the radius of curvature of the image-side surface of the second lens is not only beneficial to correct the aberrations of the optical system, but also helps to ensure that the light passes through the second lens smoothly, thereby reducing the tolerance sensitivity of the optical system.

In an exemplary embodiment, a radius of curvature R1 of the object-side surface of the first lens and a radius of curvature R2 of the image-side surface of the first lens satisfy: 0.5≤|R1/R2|≤1.5, preferably, 0.6≤|R1/R2|≤1.0. Setting the ratio of the radius of curvature of the object-side surface of the first lens to the radius of curvature of the image-side surface of the first lens within a reasonable numerical range, so that the radius of curvature of the object-side surface of the first lens is close to the radius of curvature of the image-side surface, which is beneficial for light to smoothly enter the optical system to improve the resolution of the lens assembly.

In an exemplary embodiment, a spacing distance T12 between the first lens and the second lens on the optical axis and a distance TTL from the object-side surface of the first lens to an imaging plane of the optical lens assembly on the optical axis satisfy: 0.02≤T12/TTL≤0.33, preferably, 0.05≤T12/TTL≤0.30. Rationally setting the proportional relationship between the spacing distance between the first lens and the second lens on the optical axis and the total length of the optical lens assembly to effectively control the spacing distance between the first lens and the second lens on the optical axis, which is beneficial to improve the resolution of the lens assembly.

In an exemplary embodiment, a distance T45 from the image-side surface of the fourth lens to the object-side surface of the fifth lens on the optical axis and a distance TTL from the object-side surface of the first lens to an imaging plane of the optical lens assembly on the optical axis satisfy: T45/TTL≤0.20, preferably, 0.05≤T45/TTL≤0.15. In some other exemplary embodiments, T45 and TTL may also satisfy: 0.10≤T45/TTL≤0.60, preferably, 0.15≤T45/TTL≤0.55. Rationally setting the proportional relationship between the spacing distance between the fourth lens and the fifth lens on the optical axis and the total length of the optical lens assembly to effectively control the spacing distance between the fourth lens and the fifth lens on the optical axis, which is beneficial to improve the resolution of the lens assembly.

In an exemplary embodiment, each of the first lens to the fifth lens may be an aspheric lens. The aspheric lens is characterized by a continuous change in curvature from the center of the lens to the periphery of the lens. Unlike a spherical lens having a constant curvature from the center of the lens to the periphery of the lens, the aspheric lens has a better curvature radius characteristic, and has the advantages of improving distortion aberration and improving astigmatic aberration. With aspheric lens, the aberrations that occur during imaging may be eliminated as much as possible, and thus improving the imaging quality of the lens assembly. The setting of the aspheric lens helps correct system aberrations and improve the resolution. Preferably, both the first lens and the fifth lens are aspheric lenses. The fifth lens is an aspheric lens, which is beneficial to smooth the light trend in the front optical system and improve the resolution.

The optical lens assembly according to the above embodiments of the present disclosure realizes high-definition imaging by optimizing the shape of the lenses, adopting the cemented lens setting, rationally distributing the refractive power, and appropriately setting the number of aspheric lenses. At the same time, the optical lens assembly can simultaneously satisfy the characteristics of miniaturization, high resolution, low cost, and good temperature adaptability, and meet the application requirements of miniaturization and high resolution of the on-board rear-view lens assembly.

However, it will be understood by those skilled in the art that the number of lenses constituting the lens assembly may be varied to achieve the various results and advantages described in this specification without departing from the technical solution claimed by the present disclosure. For example, although the embodiment is described by taking four lenses as an example, the optical lens assembly is not limited to include five or six lenses. The optical lens assembly may also include other numbers of lenses if desired.

Some examples of an optical lens assembly applicable to the above embodiment will be further described below with reference to the accompanying drawings.

Embodiment 1

An optical lens assembly according to embodiment 1 of the present disclosure is described below with reference to FIG. 1. FIG. 1 illustrates a schematic structural view of the optical lens assembly according to embodiment 1 of the present disclosure.

As shown in FIG. 1, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a convex surface, and an image-side surface S2 of the first lens is a concave surface.

The second lens L2 is a biconvex lens having positive refractive power, an object-side surface S4 and an image-side surface S5 of the second lens are both convex surfaces.

The third lens L3 is a biconvex lens having positive refractive power, an object-side surface S6 and an image-side surface S7 of the third lens are both convex surfaces.

The fourth lens L4 is a biconcave lens having negative refractive power, an object-side surface S7 and an image-side surface S8 of the fourth lens are both concave surfaces. The third lens L3 and the fourth lens L4 are cemented to form a cemented lens.

The fifth lens L5 is a meniscus lens having positive refractive power, an object-side surface S9 of the fifth lens is a convex surface, and an image-side surface S10 of the fifth lens is a concave surface.

The first lens L1 and the second lens L2 are both aspheric lenses, and their respective object-side surfaces and image-side surfaces are aspheric.

Alternatively, the optical lens assembly may further include an optical filter L6 having an object-side surface S11 and an image-side surface S12 and/or a cover glass L7 having an object-side surface S13 and an image-side surface S14. The optical filter L6 may be used to correct color deviations. The cover glass L7 may be used to protect an image sensor chip located on an imaging plane IMA. Light from an object sequentially passes through the respective surfaces S1 to S14 and finally images on the imaging plane IMA.

In the optical lens assembly of the present embodiment, a diaphragm STO may be disposed between the first lens L1 and the second lens L2 to improve imaging quality.

Table 1 shows the radius of curvature R, the thickness T (it should be understood that the thickness $T_1$ is the center thickness of the first lens L1, and the thickness $T_2$ is the air space between the first lens L1 and the second lens L2, and so on), the refractive index Nd, and the abbe number Vd of each lens of the optical lens assembly of embodiment 1. The unit of the radius of curvature R and the thickness T is millimeter (mm).

TABLE 1

| Surface number | Radius of curvature R | Thickness T | Refractive index Nd | Abbe number Vd |
|---|---|---|---|---|
| 1 | 10.4964 | 3.4715 | 1.59 | 61.16 |
| 2 | 7.1246 | 6.7983 | | |
| STO | Infinite | 0.1000 | | |
| 4 | 21.9898 | 4.9977 | 1.59 | 61.16 |
| 5 | −12.5930 | 0.1000 | | |
| 6 | 11.8571 | 2.8742 | 1.50 | 81.59 |
| 7 | −21.6696 | 4.8000 | 1.67 | 32.18 |
| 8 | 7.0180 | 0.7613 | | |
| 9 | 10.3460 | 5.2900 | 1.75 | 35.02 |
| 10 | 14.2351 | 0.5000 | | |
| 11 | Infinite | 0.5500 | 1.52 | 64.21 |
| 12 | Infinite | 2.0000 | | |
| 13 | Infinite | 0.5000 | 1.52 | 64.21 |
| 14 | Infinite | 1.1098 | | |
| IMA | Infinite | — | | |

The present embodiment employs five lenses as an example. The lens assembly may have at least one beneficial effect, such as miniaturization, high resolution, large aperture, high brightness and the like, by rationally configuring the refractive power, the surface shape, the center thickness of each lens, and the air space between the lenses. The surface shape Z of each aspheric surface is defined by the following formula:

$$Z(h) = \frac{ch^2}{1 + \sqrt{1-(k+1)c^2h^2}} + Ah^4 + Bh^6 + Ch^8 + Dh^{10} + Eh^{12} \quad (1)$$

Where, Z is the sag—the axis-component of the displacement of the surface from the aspheric vertex, when the surface is at height h from the optical axis; c is a paraxial curvature of the aspheric surface, c=1/R (that is, the paraxial curvature c is reciprocal of the radius of curvature R in the above Table 1); k is a conic coefficient; and A, B, C, D, E are high-order coefficients. Table 2 below shows the conic coefficient K and the high-order coefficients A, B, C, D and E applicable to aspheric surfaces S1, S2, S4 and S5 in embodiment 1.

TABLE 2

| Surface number | K | A | B | C | D | E |
|---|---|---|---|---|---|---|
| 1 | −0.7753 | −2.6132E−04 | −5.0403E−06 | 5.4604E−08 | −2.1957E−09 | 2.7354E−11 |
| 2 | −0.5435 | −5.0086E−04 | −1.1586E−05 | 1.2826E−07 | −5.8298E−09 | 1.1735E−10 |
| 4 | 0.0000 | −2.0722E−04 | −5.2275E−06 | −1.3882E−07 | 1.3956E−09 | −1.6988E−10 |
| 5 | 0.0000 | −9.9322E−05 | −2.7354E−06 | −1.2137E−07 | 1.8727E−09 | −4.6946E−11 |

Table 3 below shows a maximum field-of-view FOV of the optical lens assembly, a maximum effective aperture diameter D of the object-side surface S1 of the first lens L1 corresponding to the maximum field-of-view of the optical lens assembly, an image height 2H corresponding to the maximum field-of-view of the optical lens assembly, a center radius of curvature r1 of the object-side surface S1 of the first lens L1, a center thickness d1 of the first lens L1, a center radius of curvature r2 of the image-side surface S2 of the first lens L1, a center spacing distance T23 between the second lens L2 and the third lens L3 on the optical axis, a distance T45 from the image-side surface of the fourth lens L4 to the object-side surface of the fifth lens L5 on the optical axis, a total track length TTL of the optical lens assembly (i.e., a distance along the optical axis from the center of the object-side surface S1 of the first lens L1 to the imaging plane IMA), an optical back focal length BFL of the optical lens assembly (i.e., a distance along the optical axis from the center of the image-side surface S10 of the last lens-the fifth lens to the imaging plane IMA), a total length TL of the optical lens assembly (i.e., a distance along the optical axis from the center of the object-side surface S1 of the first lens L1 to the center of the image-side surface S10 of the last lens-the fifth lens), a total focal length value F of the optical lens assembly, a focal length value F5 of the fifth lens L5, an aperture number FNO of the optical lens assembly, respective center thicknesses d2-d5 of the second lens L2 to the fifth lens L5, and a peripheral illuminance REILL of the optical lens assembly.

TABLE 3

| D (mm) | 11.8112 | F (mm) | 16.4803 |
|---|---|---|---|
| H (mm) | 31.2000 | F5 (mm) | 31.6912 |
| FOV (°) | 9.0040 | FNO | 1.9983 |
| r1 (mm) | 10.4964 | d2 (mm) | 4.9977 |
| d1 (mm) | 3.4715 | d3 (mm) | 2.8742 |
| r2 (mm) | 7.1246 | d4 (mm) | 4.8000 |
| T23 (mm) | 0.1000 | d5 (mm) | 5.2900 |
| T45 (mm) | 0.7613 | REILL | 0.8000 |
| TTL (mm) | 33.8529 | | |
| BFL (mm) | 4.6598 | | |
| TL (mm) | 29.1931 | | |

Embodiment 2

Figure 2:
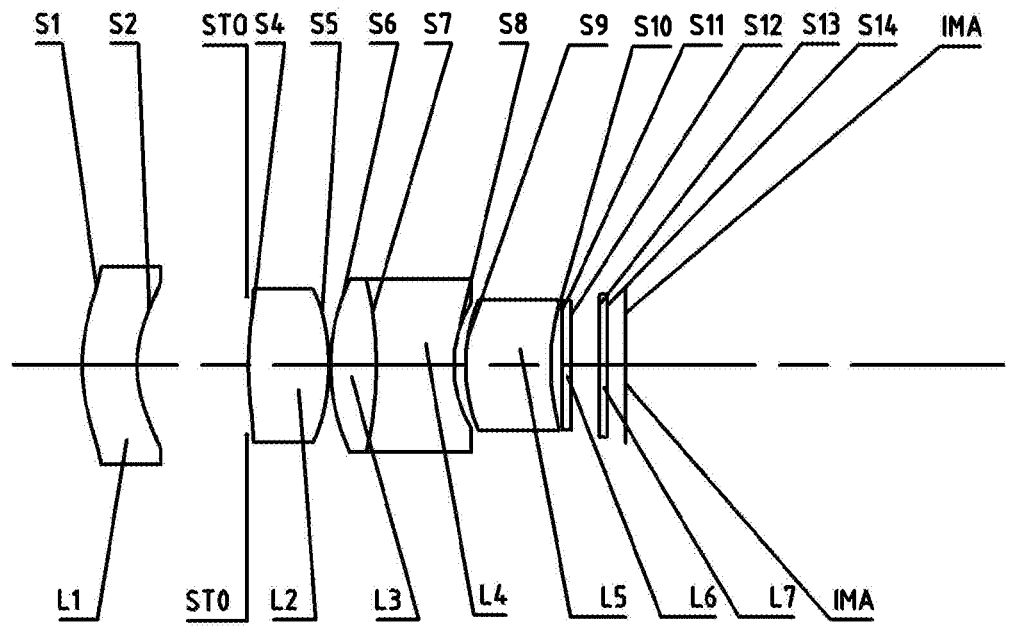
FIG. 2 illustrates a schematic structural view of an optical lens assembly according to embodiment 2 of the present disclosure.

An optical lens assembly according to Embodiment 2 of the present disclosure is described below with reference to FIG. 2. In this Embodiment and the following Embodiments, the description same as in Embodiment 1 will be omitted for brevity. FIG. 2 illustrates a schematic structural view of the optical lens assembly according to Embodiment 2 of the present disclosure.

As shown in FIG. 2, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a convex surface and an image-side surface S2 of the first lens is a concave surface.

The second lens L2 is a biconvex lens having positive refractive power, an object-side surface S4 and an image-side surface S5 of the second lens are both convex surfaces.

The third lens L3 is a biconvex lens having positive refractive power, an object-side surface S6 and an image-side surface S7 of the third lens are both convex surfaces. The fourth lens L4 is a biconcave lens having negative refractive power, an object-side surface S7 and an image-side surface S8 of the fourth lens are both concave surfaces. The third lens L3 and the fourth lens L4 are cemented to form a cemented lens.

The fifth lens L5 is a meniscus lens having positive refractive power, an object-side surface S9 of the fifth lens is a convex surface and an image-side surface S10 of the fifth lens is a concave surface.

The first lens L1 and the second lens L2 are both aspheric lenses, and their respective object-side surfaces and image-side surfaces are aspheric.

Alternatively, the optical lens assembly may further include an optical filter L6 having an object-side surface S11 and an image-side surface S12 and/or a cover glass L7 having an object-side surface S13 and an image-side surface S14. The optical filter L6 may be used to correct color deviations. The cover glass L7 may be used to protect an image sensor chip located on an imaging plane IMA. Light from an object sequentially passes through the respective surfaces S1 to S14 and is finally imaged on the imaging plane IMA.

In the optical lens assembly of the present embodiment, a diaphragm STO may be disposed between the first lens L1 and the second lens L2 to improve imaging quality.

Table 4 below shows the radius of curvature R, the thickness T, the refractive index Nd, and the abbe number Vd of each lens of the optical lens assembly of Embodiment 2. The unit of the radius of curvature R and the thickness T is millimeter (mm). Table 5 below shows the conic coefficient K and the high-order coefficients A, B, C, D and E applicable to aspheric surfaces S1, S2, S4 and S5 in embodiment 2. Table 6 below shows a maximum field-of-view FOV of the optical lens assembly, a maximum effective aperture diameter D of the object-side surface S1 of the first lens L1 corresponding to the maximum field of-view of the optical lens assembly, an image height 2H corresponding to the maximum field-of-view of the optical lens assembly, a center radius of curvature r1 of the object-side surface S1 of the first lens L1, a center thickness d1 of the first lens L1, a center radius of curvature r2 of the image-side surface S2 of the first lens L1, a center spacing T23 of the second lens L2 and the third lens L3 on the optical axis, a distance from the image-side surface of the fourth lens L4 to the object-side surface of the fifth lens L5 on the optical axis, a total track length TTL of the optical lens assembly, an optical back focal length BFL of the optical lens assembly, a lens group length TL of the optical lens assembly, a total focal length value F of the optical lens assembly, a focal length value F5 of the fifth lens L5, an aperture number FNO of the optical lens assembly, respective center thicknesses d2-d5 of the second lens L2 to the fifth lens L5, and a peripheral illuminance REILL of the optical lens assembly.

TABLE 4

| Surface number | Radius of curvature R | Thickness T | Refractive index Nd | Abbe number Vd |
|---|---|---|---|---|
| 1 | 10.4956 | 3.4377 | 1.59 | 61.16 |
| 2 | 7.1244 | 6.8007 | | |
| STO | Infinite | 0.1000 | | |
| 4 | 22.1347 | 5.0000 | 1.59 | 61.16 |
| 5 | −12.5192 | 0.1000 | | |
| 6 | 11.8833 | 2.8782 | 1.50 | 81.59 |
| 7 | −21.4162 | 4.8000 | 1.67 | 32.18 |
| 8 | 7.0570 | 0.7613 | | |
| 9 | 10.4380 | 5.2900 | 1.75 | 35.02 |
| 10 | 14.3501 | 0.5000 | | |
| 11 | Infinite | 0.5500 | 1.52 | 64.21 |
| 12 | Infinite | 2.0000 | | |
| 13 | Infinite | 0.5000 | 1.52 | 64.21 |
| 14 | Infinite | 1.1323 | | |
| IMA | Infinite | — | | |

TABLE 5

| Surface number | K | A | B | C | D | E |
|---|---|---|---|---|---|---|
| 1 | −0.7753 | −2.6377E−04 | −5.0004E−06 | 5.1806E−08 | −2.3218E−09 | 3.2511E−11 |
| 2 | −0.5435 | −4.9580E−04 | −1.1727E−05 | 1.2197E−07 | −5.6165E−09 | 1.2706E−10 |
| 4 | 0.0000 | −2.0567E−04 | −5.1327E−06 | −1.3783E−07 | 1.3012E−09 | −1.6459E−10 |
| 5 | 0.0000 | −9.7421E−05 | −2.6929E−06 | −1.1870E−07 | 2.0190E−09 | −5.9585E−11 |

TABLE 6

| D (mm) | 11.8911 | F (mm) | 16.4703 |
|---|---|---|---|
| H (mm) | 31.2000 | F5 (mm) | 32.1117 |
| FOV (°) | 8.9900 | FNO | 1.9952 |
| r1 (mm) | 10.4956 | d2 (mm) | 5.0000 |
| d1 (mm) | 3.4377 | d3 (mm) | 2.8782 |
| r2 (mm) | 7.1244 | d4 (mm) | 4.8000 |
| T23 (mm) | 0.1000 | d5 (mm) | 5.2900 |
| T45 (mm) | 0.7613 | REILL | 0.7630 |
| TTL (mm) | 33.8502 | | |
| BFL (mm) | 4.6823 | | |
| TL (mm) | 29.1679 | | |

Embodiment 3

Figure 3:
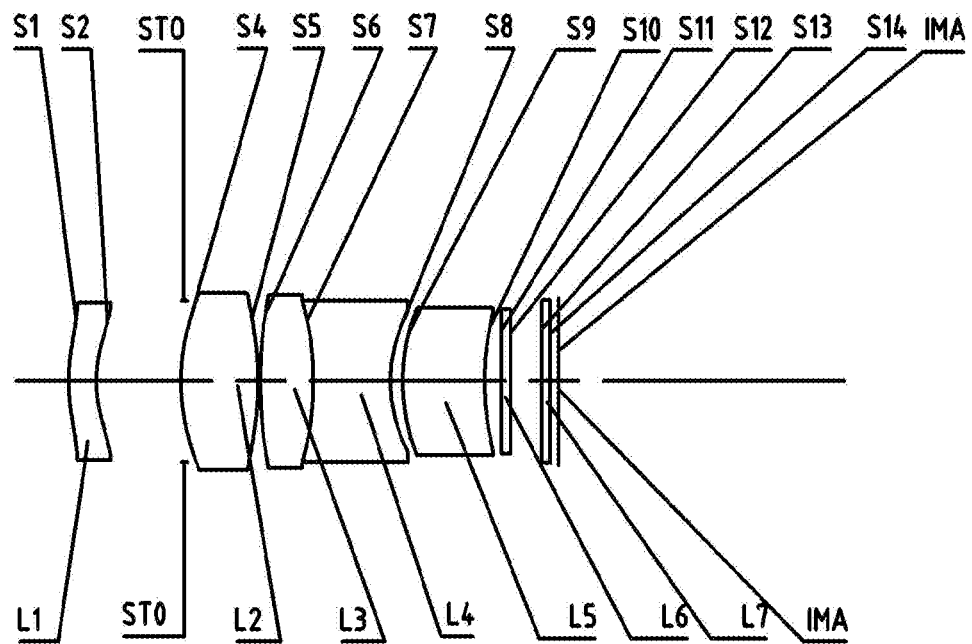
FIG. 3 illustrates a schematic structural view of an optical lens assembly according to embodiment 3 of the present disclosure.

An optical lens assembly according to Embodiment 3 of the present disclosure is described below with reference to FIG. 3. FIG. 3 illustrates a schematic structural view of the optical lens assembly according to Embodiment 3 of the present disclosure.

As shown in FIG. 3, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a convex surface, and an image-side surface S2 of the first lens is a concave surface.

The second lens L2 is a biconvex lens having positive refractive power, an object-side surface S4 and an image-side surface S5 of the second lens are both convex surfaces.

The third lens L3 is a biconvex lens having positive refractive power, an object-side surface S6 and an image-side surface S7 of the third lens are both convex surfaces. The fourth lens L4 is a biconcave lens having negative refractive power, an object-side surface S7 and an image-side surface S8 of the fourth lens are both concave surfaces. The third lens L3 and the fourth lens L4 are cemented to form a cemented lens.

The fifth lens L5 is a meniscus lens having positive refractive power, an object-side surface S9 of the fifth lens is a convex surface, and an image-side surface S10 of the fifth lens is a concave surface.

The first lens L1 and the second lens L2 are both aspheric lenses, and their respective object-side surfaces and image-side surfaces are aspheric.

Alternatively, the optical lens assembly may further include an optical filter L6 having an object-side surface S11 and an image-side surface S12 and/or a cover glass L7 having an object-side surface S13 and an image-side surface S14. The optical filter L6 may be used to correct color deviations. The cover glass L7 may be used to protect an image sensor chip located on an imaging plane IMA. Light from an object sequentially passes through the respective surfaces S1 to S14 and is finally imaged on the imaging plane IMA.

In the optical lens assembly of the present embodiment, a diaphragm STO may be disposed between the first lens L1 and the second lens L2 to improve imaging quality.

Table 7 below shows the radius of curvature R, the thickness T, the refractive index Nd, and the abbe number Vd of each lens of the optical lens assembly of embodiment 3. The unit of the radius of curvature R and the thickness T is millimeter (mm). Table 8 below shows the conic coefficient K and the high-order coefficients A, B, C, D and E applicable to aspheric surfaces S1, S2, S4 and S5 in embodiment 3. Table 9 below shows a maximum field-of-view FOV of the optical lens assembly, a maximum effective aperture diameter D of the object-side surface S1 of the first lens L1 corresponding to the maximum field of-view of the optical lens assembly, an image height 2H corresponding to the maximum field-of view of the optical lens assembly, a center radius of curvature r1 of the object-side surface S1 of the first lens L1, a center thickness d1 of the first lens L1, a center radius of curvature r2 of the image-side surface S2 of the first lens L1, a center spacing T23 of the second lens L2 and the third lens L3 on the optical axis, a distance T45 from the image-side surface of the fourth lens L4 to the object-side surface of the fifth lens L5 on the optical axis, a total track length TTL of the optical lens assembly, an optical back focal length BFL of the optical lens assembly, a lens group length TL of the optical lens assembly, a total focal length value F of the optical lens assembly, a focal length value F5 of the fifth lens L5, an aperture number FNO of the optical lens assembly, respective center thicknesses d2-d5 of the second lens L2 to the fifth lens L5, and a peripheral illuminance REILL of the optical lens assembly.

TABLE 7

| Surface number | Radius of curvature R | Thickness T | Refractive index Nd | Abbe number Vd |
|---|---|---|---|---|
| 1 | 9.4775 | 1.6831 | 1.59 | 61.16 |
| 2 | 6.3033 | 5.3732 | | |
| STO | Infinite | −0.1730 | | |
| 4 | 10.7406 | 4.7164 | 1.59 | 61.16 |
| 5 | −14.3999 | 0.1000 | | |
| 6 | 20.5356 | 3.2947 | 1.50 | 81.59 |
| 7 | −13.9256 | 4.6944 | 1.67 | 32.18 |
| 8 | 7.2325 | 0.7613 | | |
| 9 | 9.8042 | 5.0000 | 1.75 | 35.02 |
| 10 | 13.3262 | 0.5000 | | |
| 11 | Infinite | 0.5500 | 1.52 | 64.21 |
| 12 | Infinite | 2.5000 | | |
| 13 | Infinite | 0.5000 | 1.52 | 64.21 |
| 14 | Infinite | 0.5021 | | |
| IMA | Infinite | — | | |

TABLE 8

| Surface number | K | A | B | C | D | E |
|---|---|---|---|---|---|---|
| 1 | −4.1084 | −7.3713E−04 | −2.2276E−05 | 8.9991E−07 | −2.3214E−08 | 2.9046E−10 |
| 2 | −1.7756 | −1.0961E−03 | −2.0793E−05 | 1.5105E−06 | −4.8231E−08 | 6.9288E−10 |
| 4 | 0.0000 | −2.7953E−05 | −2.6147E−07 | 4.9780E−09 | 6.7265E−10 | 6.5113E−12 |
| 5 | 0.0000 | 2.3960E−04 | 1.5436E−06 | 2.4560E−08 | −5.5382E−10 | 3.4112E−11 |

TABLE 9

| D (mm) | 8.4973 | F (mm) | 16.2759 |
|---|---|---|---|
| H (mm) | 31.2000 | F5 (mm) | 30.5514 |
| FOV (°) | 9.0500 | FNO | 2.0497 |
| r1 (mm) | 9.4775 | d2 (mm) | 4.7164 |
| d1 (mm) | 1.6831 | d3 (mm) | 3.2947 |
| r2 (mm) | 6.3033 | d4 (mm) | 4.6944 |
| T23 (mm) | 0.1000 | d5 (mm) | 5.0000 |
| T45 (mm) | 0.7613 | REILL | 0.7057 |
| TTL (mm) | 30.0021 | | |
| BFL (mm) | 4.5521 | | |
| TL (mm) | 25.4500 | | |

Embodiment 4

Figure 4:
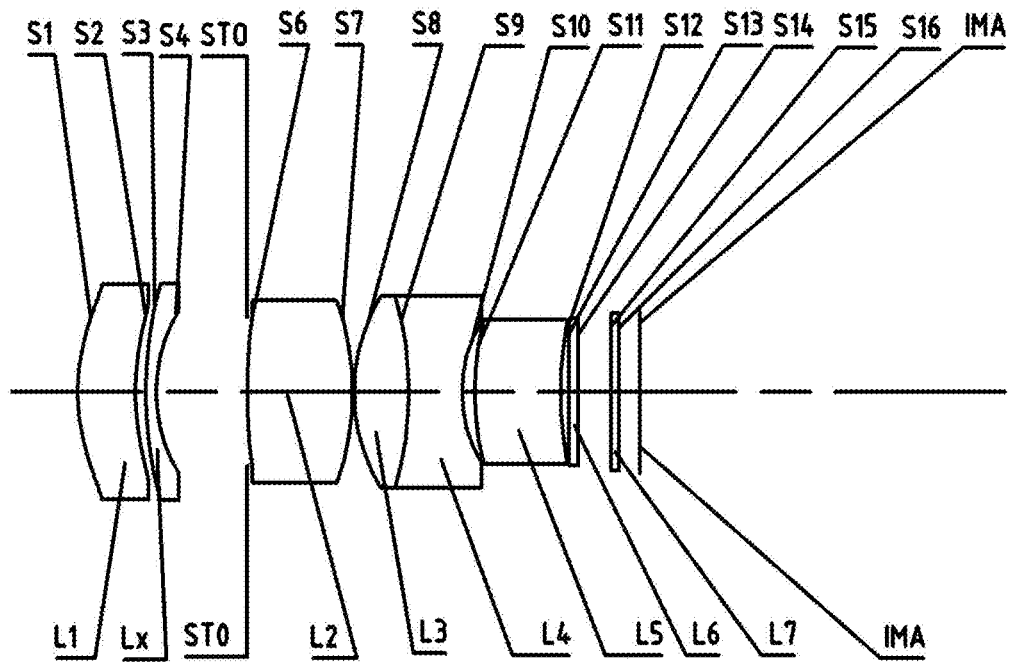
FIG. 4 illustrates a schematic structural view of an optical lens assembly according to embodiment 4 of the present disclosure.

An optical lens assembly according to Embodiment 4 of the present disclosure is described below with reference to FIG. 4. FIG. 4 illustrates a schematic structural view of the optical lens assembly according to Embodiment 4 of the present disclosure.

As shown in FIG. 4, the optical lens assembly includes a first lens L1, an additional lens Lx, a second lens L2, a third lens L3, a fourth lens L4 and a fifth lens L5, which are sequentially arranged from an object side to an image side along an optical axis.

The first lens L1 is a meniscus lens having positive refractive power, an object-side surface S1 of the first lens is a convex surface, and an image-side surface S2 of the first lens is a concave surface. The first lens L1 is an aspheric lens, and the object-side surface S1 of the first lens and the image-side surface S2 of the first lens are both aspheric.

The additional lens Lx is a meniscus lens having negative refractive power, an object-side surface S3 of the additional lens is a convex surface, and an image-side surface S4 of the additional lens is a concave surface.

The second lens L2 is a biconvex lens having positive refractive power, an object-side surface S6 and an image-side surface S7 of the second lens are both convex surfaces.

The third lens L3 is a biconvex lens having positive refractive power, an object-side surface S8 and an image-side surface S9 of the third lens are both convex surfaces.

The fourth lens L4 is a biconcave lens having negative refractive power, an object-side surface S9 and an image-side surface S10 of the fourth lens are both concave surfaces. The third lens L3 and the fourth lens L4 are cemented to form a cemented lens.

The fifth lens L5 is a meniscus lens having positive refractive power, an object-side surface S11 of the fifth lens is a convex surface, and an image-side surface S12 of the fifth lens is a concave surface.

Alternatively, the optical lens assembly may further include an optical filter L6 having an object-side surface S13 and an image-side surface S14 and/or a cover glass L7 having an object-side surface S15 and an image-side surface S16. The optical filter L6 may be used to correct color deviations. The cover glass L7 may be used to protect an image sensor chip located on an imaging plane IMA. Light from an object sequentially passes through the respective surfaces S1 to S16 and finally images on the imaging plane IMA.

In the optical lens assembly of the present embodiment, a diaphragm STO may be disposed between the additional lens Lx and the second lens L2 to improve imaging quality.

Table 10 below shows the radius of curvature R, the thickness T, the refractive index Nd, and the abbe number Vd of each lens of the optical lens assembly of embodiment 4. The unit of the radius of curvature R and the thickness T is millimeter (mm). Table 11 below shows the conic coefficient K and the high-order coefficients A, B, C, D and E applicable to aspheric surfaces S1 and S2 in embodiment 4. Table 12 below shows a maximum field-of-view FOV of the optical lens assembly, a maximum effective aperture diameter D of the object-side surface S1 of the first lens L1 corresponding to the maximum field-of-view of the optical lens assembly, an image height 2H corresponding to the maximum field-of-view of the optical lens assembly, a center radius of curvature r1 of the object side surface S1 of the first lens L1, a center radius of curvature r2 of the image-side surface S2 of the first lens L1, a center radius of curvature r3 of the object-side surface S3 of the additional lens Lx, a center thickness d1 of the first lens L1, a center spacing distance T12 of the first lens L1 and the second lens L2 on the optical axis, a center spacing T23 of the second lens L2 and the third lens L3 on the optical axis, a distance T45 from the image-side surface of the fourth lens L4 to the object-side surface of the fifth lens L5 on the optical axis, a center spacing T1x of the first lens L1 and the additional lens Lx on the optical axis, a total track length TTL of the optical lens assembly, an optical back focal length BFL of the optical lens assembly, a total length TL of the optical lens assembly, a total focal length value F of the optical lens assembly, a focal length value F5 of the fifth lens L5, an aperture number FNO of the optical lens assembly, respective center thicknesses d2-d5 of the second lens L2 to the fifth lens L5, and a peripheral illuminance REILL of the optical lens assembly.

TABLE 10

| Surface number | Radius of curvature R | Thickness T | Refractive index Nd | Abbe number Vd |
|---|---|---|---|---|
| 1 | 10.4956 | 3.5000 | 1.59 | 61.16 |
| 2 | 13.5248 | 0.5959 | | |
| STO | 20.3750 | 0.6520 | 1.65 | 33.84 |
| 4 | 8.0569 | 5.5063 | | |
| 5 | Infinite | 0.0000 | | |
| 6 | 27.2596 | 6.3974 | 1.74 | 44.90 |
| 7 | −13.7841 | 0.1000 | | |
| 8 | 9.5146 | 3.3054 | 1.50 | 81.59 |
| 9 | −17.1735 | 3.2279 | 1.67 | 32.18 |
| 10 | 7.1010 | 0.7613 | | |
| 11 | 13.9471 | 5.2316 | 1.59 | 61.25 |
| 12 | 20.3652 | 0.5000 | | |
| 13 | Infinite | 0.5500 | 1.52 | 64.21 |
| 14 | Infinite | 2.0000 | | |
| 15 | Infinite | 0.5000 | 1.52 | 64.21 |
| 16 | Infinite | 1.2397 | | |
| IMA | Infinite | | | |

TABLE 11

| Surface number | K | A | B | C | D | E |
|---|---|---|---|---|---|---|
| 1 | −0.0318 | −1.4341E−04 | −2.4664E−06 | −2.9068E−08 | −1.5591E−09 | 2.4521E−11 |
| 2 | −0.0325 | −1.3774E−04 | −3.8464E−06 | −1.1905E−07 | 1.5967E−09 | 3.4658E−11 |

TABLE 12

| D (mm) | 11.9037 | BFL (mm) | 4.7879 |
|---|---|---|---|
| H (mm) | 31.2000 | TL (mm) | 29.2796 |
| FOV (°) | 9.0140 | F (mm) | 16.4387 |
| r1 (mm) | 10.4956 | F5 (mm) | 57.4569 |
| r2 (mm) | 13.5248 | FNO | 2.0037 |
| r3 (mm) | 20.3750 | d2 (mm) | 6.3974 |
| d1 (mm) | 3.5000 | d3 (mm) | 3.3054 |
| T12 (mm) | 6.7542 | d4 (mm) | 3.2279 |
| T23 (mm) | 0.1000 | d5 (mm) | 5.2316 |
| T45 (mm) | 0.7613 | REILL | 0.8141 |
| T1x (mm) | 0.5959 | | |
| TTL (mm) | 34.0675 | | |

Embodiment 5

Figure 5:
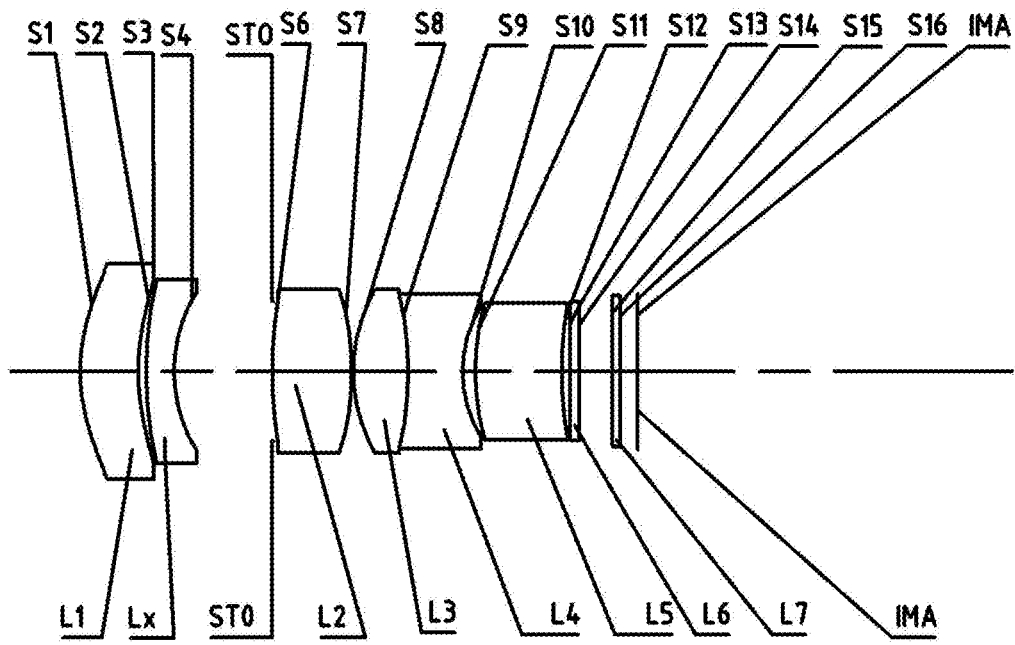
FIG. 5 illustrates a schematic structural view of an optical lens assembly according to embodiment 5 of the present disclosure.

An optical lens assembly according to Embodiment 5 of the present disclosure is described below with reference to FIG. 5. FIG. 5 illustrates a schematic structural view of the optical lens assembly according to Embodiment 5 of the present disclosure.

As shown in FIG. 5, the optical lens assembly includes a first lens L1, an additional lens Lx, a second lens L2, a third lens L3, a fourth lens L4 and a fifth lens L5, which are sequentially arranged from an object side to an image side along an optical axis.

The first lens L1 is a meniscus lens having positive refractive power, an object-side surface S1 of the first lens is a convex surface, and an image-side surface S2 of the first lens is a concave surface. The first lens L1 is an aspheric lens, and the object-side surface S1 of the first lens and the image-side surface S2 of the first lens are both aspheric.

The additional lens Lx is a meniscus lens having negative refractive power, an object-side surface S3 of the additional lens is a convex surface, and an image-side surface S4 of the additional lens is a concave surface.

The second lens L2 is a biconvex lens having positive refractive power, an object-side surface S6 and an image-side surface S7 of the second lens are both convex surfaces.

The third lens L3 is a biconvex lens having positive refractive power, an object-side surface S8 and an image-side surface S9 of the third lens are both convex surfaces. The fourth lens L4 is a biconcave lens having negative refractive power, an object-side surface S9 and an image-side surface S10 of the fourth lens are both concave surfaces. The third lens L3 and the fourth lens L4 are cemented to form a cemented lens.

The fifth lens L5 is a meniscus lens having positive refractive power, an object-side surface S11 of the fifth lens is a convex surface, and an image-side surface S12 of the fifth lens is a concave surface.

Alternatively, the optical lens assembly may further include an optical filter L6 having an object-side surface S13 and an image-side surface S14 and/or a cover glass L7 having an object-side surface S15 and an image-side surface S16. The optical filter L6 may be used to correct color deviations. The cover glass L7 may be used to protect an image sensor chip located on an imaging plane IMA. Light from an object sequentially passes through the respective surfaces S1 to S16 and is finally imaged on the imaging plane IMA.

In the optical lens assembly of the present embodiment, a diaphragm STO may be disposed between the additional lens Lx and the second lens L2 to improve imaging quality.

Table 13 below shows the radius of curvature R, the thickness T, the refractive index Nd, and the abbe number Vd of each lens of the optical lens assembly of embodiment 5. The unit of the radius of curvature R and the thickness T is millimeter (mm). Table 14 below shows the conic coefficient K and the high-order coefficients A, B, C, D and E applicable to aspheric surfaces S1 and S2 in embodiment 5. Table 15 below shows a maximum field-of-view FOV of the optical lens assembly, a maximum effective aperture diameter D of the object-side surface S1 of the first lens L1 corresponding to the maximum field-of-view of the optical lens assembly, an image height 2H corresponding to the maximum field-of-view of the optical lens assembly, a center radius of curvature r1 of the object side surface S1 of the first lens L1, a center radius of curvature r2 of the image-side surface S2 of the first lens L1, a center radius of curvature r3 of the object-side surface S3 of the additional lens Lx, a center thickness d1 of the first lens L1, a center spacing distance T12 of the first lens L1 and the second lens L2 on the optical axis, a center spacing T23 of the second lens L2 and the third lens L3 on the optical axis, a distance T45 from the image-side surface of the fourth lens L4 to the object-side surface of the fifth lens L5 on the optical axis, a center spacing T1x of the first lens L1 and the additional lens Lx on the optical axis, a total track length TTL of the optical lens assembly, an optical back focal length BFL of the optical lens assembly, a total length TL of the optical lens assembly, a total focal length value F of the optical lens assembly, a focal length value F5 of the fifth lens L5, an aperture number FNO of the optical lens assembly, respective center thicknesses d2-d5 of the second lens L2 to the fifth lens L5, and a peripheral illuminance REILL of the optical lens assembly.

TABLE 13

| Surface number | Radius of curvature R | Thickness T | Refractive index Nd | Abbe number Vd |
|---|---|---|---|---|
| 1 | 10.4956 | 3.5000 | 1.59 | 61.2 |
| 2 | 13.1776 | 0.4610 | | |
| STO | 22.1628 | 1.6857 | 1.65 | 33.8 |
| 4 | 8.4036 | 5.9242 | | |
| 5 | Infinite | 0.0000 | | |
| 6 | 25.0004 | 4.7891 | 1.74 | 44.9 |
| 7 | −14.9738 | 0.1000 | | |
| 8 | 9.2999 | 3.3107 | 1.50 | 81.6 |
| 9 | −18.7163 | 3.2584 | 1.67 | 32.2 |
| 10 | 6.8644 | 0.7613 | | |
| 11 | 13.2091 | 5.2316 | 1.59 | 61.2 |
| 12 | 22.0033 | 0.5000 | | |
| 13 | Infinite | 0.5500 | 1.52 | 64.2 |
| 14 | Infinite | 2.0000 | | |
| 15 | Infinite | 0.5000 | 1.52 | 64.2 |
| 16 | Infinite | 1.0183 | | |
| IMA | Infinite | | | |

TABLE 14

| Surface number | K | A | B | C | D | E |
|---|---|---|---|---|---|---|
| 1 | 0.0004 | −1.3384E−04 | −2.6712E−06 | −1.7541E−08 | −9.6131E−10 | 9.0607E−12 |
| 2 | 0.0004 | −1.3375E−04 | −3.7233E−06 | −7.0089E−08 | 8.4213E−10 | 7.9111E−12 |

TABLE 15

| D (mm) | 12.4815 | BFL (mm) | 4.5683 |
|---|---|---|---|
| H (mm) | 31.2000 | TL (mm) | 29.0220 |
| FOV (°) | 9.0120 | F (mm) | 16.4930 |
| r1 (mm) | 10.4956 | F5 (mm) | 45.7838 |
| r2 (mm) | 13.1776 | FNO | 2.0058 |
| r3 (mm) | 22.1628 | d2 (mm) | 4.7891 |
| d1 (mm) | 3.5000 | d3 (mm) | 3.3107 |
| T12 (mm) | 8.0709 | d4 (mm) | 3.2584 |
| T23 (mm) | 0.1000 | d5 (mm) | 5.2316 |
| T45 (mm) | 0.7613 | REILL | 0.7912 |
| T1x (mm) | 0.4610 | | |
| TTL (mm) | 33.5903 | | |

Embodiment 6

Figure 6:
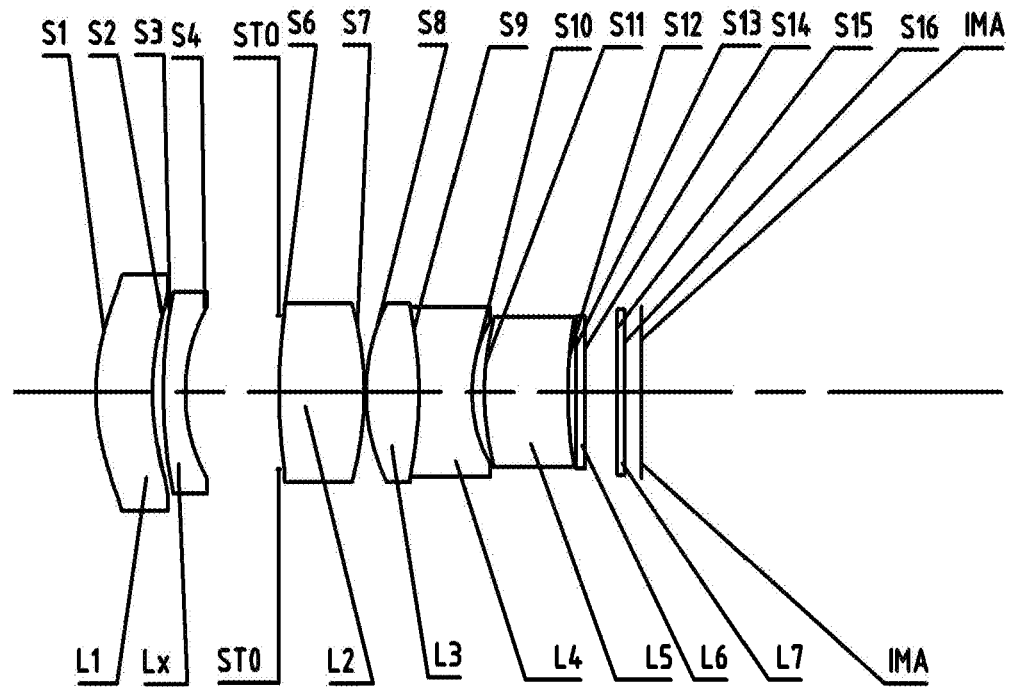
FIG. 6 illustrates a schematic structural view of an optical lens assembly according to embodiment 6 of the present disclosure.

An optical lens assembly according to Embodiment 6 of the present disclosure is described below with reference to FIG. 6. FIG. 6 illustrates a schematic structural view of the optical lens assembly according to Embodiment 6 of the present disclosure.

As shown in FIG. 6 the optical lens assembly includes a first lens L1, an additional lens Lx, a second lens L2, a third lens L3, a fourth lens L4 and a fifth lens L5, which are sequentially arranged from an object side to an image side along an optical axis.

The first lens L1 is a meniscus lens having positive refractive power, an object-side surface S1 of the first lens is a convex surface, and an image-side surface S2 of the first lens is a concave surface. The first lens L1 is an aspheric lens, and the object-side surface S1 of the first lens and the image-side surface S2 of the first lens are both aspheric.

The additional lens Lx is a meniscus lens having negative refractive power, an object-side surface S3 of the additional lens is a convex surface, and an image-side surface S4 of the additional lens is a concave surface.

The second lens L2 is a biconvex lens having positive refractive power, an object-side surface S6 and an image-side surface S7 of the second lens are both convex surfaces.

The third lens L3 is a biconvex lens having positive refractive power, an object-side surface S8 and an image-side surface S9 of the third lens are both convex surfaces.

The fourth lens L4 is a biconcave lens having negative refractive power, an object-side surface S9 and an image-side surface S10 of the fourth lens are both concave surfaces. The third lens L3 and the fourth lens L4 are cemented to form a cemented lens.

The fifth lens L5 is a meniscus lens having positive refractive power, an object-side surface S11 of the fifth lens is a convex surface, and an image-side surface S12 of the fifth lens is a concave surface.

Alternatively, the optical lens assembly may further include an optical filter L6 having an object-side surface S13 and an image-side surface S14 and/or a cover glass L7 having an object-side surface S15 and an image-side surface S16. The optical filter L6 may be used to correct color deviations. The cover glass L7 may be used to protect an image sensor chip located on an imaging plane IMA. Light from an object sequentially passes through the respective surfaces S1 to S16 and is finally imaged on the imaging plane IMA.

In the optical lens assembly of the present embodiment, a diaphragm STO may be disposed between the additional lens Lx and the second lens L2 to improve imaging quality.

Table 16 below shows the radius of curvature R, the thickness T, the refractive index Nd, and the abbe number Vd of each lens of the optical lens assembly of embodiment 6. The unit of the radius of curvature R and the thickness T is millimeter (mm). Table 17 below shows the conic coefficient K and the high-order coefficients A, B, C, D and E applicable to aspheric surfaces S1-S2 and S6-S9 in embodiment 6. Table 18 below shows a maximum field-of-view FOV of the optical lens assembly, a maximum effective aperture diameter D of the object-side surface S1 of the first lens L1 corresponding to the maximum field-of-view of the optical lens assembly, an image height 2H corresponding to the maximum field-of-view of the optical lens assembly, a center radius of curvature r1 of the object side surface S1 of the first lens L1, a center radius of curvature r2 of the image-side surface S2 of the first lens L1, a center radius of curvature r3 of the object-side surface S3 of the additional lens Lx, a center thickness d1 of the first lens L1, a center spacing distance T12 between the first lens L1 and the second lens L2 on the optical axis, a center spacing distance T23 between the second lens L2 and the third lens L3 on the optical axis, a distance T45 from the image-side surface of the fourth lens L4 to the object-side surface of the fifth lens L5 on the optical axis, a center spacing T1x of the first lens L1 and the additional lens Lx on the optical axis, a total track length TTL of the optical lens assembly, an optical back focal length BFL of the optical lens assembly, a total length TL of the optical lens assembly, a total focal length value F of the optical lens assembly, a focal length value F5 of the fifth lens L5, an aperture number FNO of the optical lens assembly, respective center thicknesses d2-d5 of the second lens L2 to the fifth lens L5, and a peripheral illuminance REILL of the optical lens assembly.

TABLE 16

| Surface number | Radius of curvature R | Thickness T | Refractive index Nd | Abbe number Vd |
|---|---|---|---|---|
| 1 | 10.4722 | 3.5186 | 1.59 | 61.2 |
| 2 | 13.2506 | 0.5946 | | |
| 3 | 22.1551 | 1.3857 | 1.65 | 33.8 |
| 4 | 8.4083 | 5.8238 | | |
| ST0 | Infinite | 0.0000 | | |
| 6 | 24.9496 | 5.3148 | 1.74 | 44.9 |
| 7 | −14.9725 | 0.1000 | | |
| 8 | 9.3020 | 3.3013 | 1.50 | 81.6 |
| 9 | −18.3727 | 3.2505 | 1.67 | 32.2 |
| 10 | 6.8862 | 0.7613 | | |
| 11 | 12.9631 | 5.2122 | 1.59 | 61.2 |
| 12 | 20.6728 | 0.5000 | | |
| 13 | Infinite | 0.5500 | 1.52 | 64.2 |
| 14 | Infinite | 2.0000 | | |
| 15 | Infinite | 0.5000 | 1.52 | 64.2 |
| 16 | Infinite | 1.0093 | | |
| IMA | Infinite | | | |

TABLE 17

| Surface number | K | A | B | C | D | E |
|---|---|---|---|---|---|---|
| 1 | 0.0113 | −1.3434E−04 | −2.6808E−06 | −1.6689E−08 | −9.8452E−10 | 7.6969E−12 |
| 2 | 0.0187 | −1.3446E−04 | −3.8942E−06 | −7.7239E−08 | 9.4557E−10 | 5.0344E−12 |

TABLE 18

| D (mm) | 12.4815 | BFL (mm) | 4.5593 |
|---|---|---|---|
| H (mm) | 31.2000 | TL (mm) | 29.2625 |
| FOV (°) | 9.0080 | F (mm) | 16.4845 |
| r1 (mm) | 10.4722 | F5 (mm) | 46.9918 |
| r2 (mm) | 13.2506 | FNO | 2.0042 |
| r3 (mm) | 22.1551 | d2 (mm) | 5.3148 |
| d1 (mm) | 3.5186 | d3 (mm) | 3.3013 |
| T12 (mm) | 7.8041 | d4 (mm) | 3.2505 |
| T23 (mm) | 0.1000 | d5 (mm) | 5.2122 |
| T45 (mm) | 0.7613 | REILL | 0.7954 |
| T1x (mm) | 0.5946 | | |
| TTL (mm) | 33.8218 | | |

In view of the above, Embodiments 1 to 6 respectively satisfy the relationships shown in Table 19 below.

| Condition/Embodiment | 1 | 2 | 3 | 4 | 5 | 6 |
|---|---|---|---|---|---|---|
| D | 11.811 | 11.891 | 8.497 | 11.904 | 12.482 | 12.482 |
| H | 9.004 | 8.990 | 9.050 | 9.014 | 9.012 | 9.008 |
| FOV | 31.2 | 31.2 | 31.2 | 31.2 | 31.2 | 31.2 |
| TTL | 33.853 | 33.850 | 30.002 | 34.068 | 33.590 | 33.822 |
| F | 16.480 | 16.470 | 16.276 | 16.439 | 16.493 | 16.485 |
| BFL | 4.660 | 4.682 | 4.552 | 4.790 | 4.568 | 4.560 |
| TL | 29.193 | 29.168 | 25.450 | 29.278 | 29.022 | 29.262 |
| F1 | −60.758 | −60.403 | −39.645 | 55.458 | 58.745 | 57.448 |
| F2 | 14.313 | 14.292 | 11.186 | 13.121 | 13.204 | 13.273 |
| F3 | 15.831 | 15.791 | 17.200 | 12.815 | 12.798 | 12.905 |
| F4 | −7.334 | −7.340 | −6.452 | −7.041 | −7.055 | −7.032 |
| F34 | −22.344 | −22.443 | −13.635 | −30.072 | −30.166 | −30.152 |
| F5 | 31.691 | 32.112 | 30.551 | 57.457 | 45.784 | 46.992 |
| R1 | 10.496 | 10.496 | 9.478 | 10.496 | 10.496 | 10.472 |
| R2 | 7.125 | 7.124 | 6.303 | 13.525 | 13.178 | 13.251 |
| d1 | 3.472 | 3.437 | 1.683 | 3.500 | 3.500 | 3.519 |
| R3 | / | / | / | 20.375 | 22.163 | 22.155 |
| R4 | 21.990 | 22.135 | 10.741 | 27.260 | 25.000 | 24.950 |
| R5 | −12.593 | −12.520 | −14.400 | −13.784 | −14.974 | −14.972 |
| T1x | / | / | / | 0.596 | 0.461 | 0.595 |

-continued

| Condition/Embodiment | 1 | 2 | 3 | 4 | 5 | 6 |
|---|---|---|---|---|---|---|
| T12 | 6.898 | 6.901 | 5.200 | 6.754 | 8.071 | 7.804 |
| T23 | 0.100 | 0.100 | 0.100 | 0.100 | 0.100 | 0.100 |
| T45 | 0.761 | 0.761 | 0.761 | 0.761 | 0.761 | 0.761 |
| SL | 23.483 | 23.499 | 23.143 | 23.813 | 22.019 | 22.499 |
| CT2 | 4.998 | 5.000 | 4.716 | 6.397 | 4.789 | 5.315 |
| Nd3 | 1.50 | 1.50 | 1.50 | 1.50 | 1.50 | 1.50 |
| Nd4 | 1.67 | 1.67 | 1.67 | 1.67 | 1.67 | 1.67 |
| Vd4 | 32.20 | 32.20 | 32.20 | 32.20 | 32.20 | 32.20 |
| Vd3 | 81.60 | 81.60 | 81.60 | 81.60 | 81.60 | 81.60 |
| ΣCT | 21.434 | 21.406 | 19.389 | 21.662 | 20.090 | 20.598 |
| DSR3 | 0.100 | 0.100 | −0.173 | 0 | 0 | 0 |
| D/H/FOV | 0.042 | 0.042 | 0.030 | 0.042 | 0.044 | 0.044 |
| TTL/F | 2.054 | 2.055 | 1.843 | 2.072 | 2.037 | 2.052 |
| T45/TTL | 0.022 | 0.022 | 0.025 | 0.022 | 0.023 | 0.023 |
| BFL/TL | 0.160 | 0.161 | 0.179 | 0.164 | 0.157 | 0.156 |
| BFL/TTL | 0.138 | 0.138 | 0.152 | 0.141 | 0.136 | 0.135 |
| max{dn/dm}1~5 | 1.841 | 1.838 | 2.971 | 1.982 | 1.606 | 1.635 |
| max{dn/dm}2~5 | 1.841 | 1.838 | 1.518 | 1.982 | 1.606 | 1.635 |
| \|F3/F4\| | 2.159 | 2.151 | 2.666 | 1.820 | 1.814 | 1.835 |
| \|F4/F3\| | 0.463 | 0.465 | 0.375 | 0.549 | 0.551 | 0.545 |
| \|F34/F\| | 1.356 | 1.363 | 0.838 | 1.829 | 1.829 | 1.829 |
| \|F/F34\| | 0.738 | 0.734 | 1.194 | 0.547 | 0.547 | 0.547 |
| (R2 + d1)/R1 | 1.010 | 1.006 | 0.843 | 1.622 | 1.589 | 1.601 |
| T23/TTL | 0.003 | 0.003 | 0.003 | 0.003 | 0.003 | 0.003 |
| F5/F | 1.923 | 1.950 | 1.877 | 3.495 | 2.776 | 2.851 |
| (R2 − R3)/(R2 + R3) | / | / | / | −0.202 | −0.254 | −0.251 |
| T1x/T12 | / | / | / | 0.088 | 0.057 | 0.076 |
| SL/TTL | 0.694 | 0.694 | 0.771 | 0.699 | 0.656 | 0.665 |
| CT2/T12 | 0.725 | 0.725 | 0.907 | 0.947 | 0.593 | 0.681 |
| Nd2 | 1.59 | 1.59 | 1.59 | 1.65 | 1.65 | 1.65 |
| F2/F | 0.868 | 0.868 | 0.687 | 0.798 | 0.801 | 0.805 |
| Nd3/Nd4 | 0.898 | 0.898 | 0.898 | 0.898 | 0.898 | 0.898 |
| Vd/Vd3 | 0.395 | 0.395 | 0.395 | 0.395 | 0.395 | 0.395 |
| ΣCT/TTL | 0.633 | 0.632 | 0.646 | 0.636 | 0.598 | 0.609 |
| F3/F | 0.961 | 0.959 | 1.057 | 0.780 | 0.776 | 0.783 |
| TTL/H/FOV | 0.121 | 0.121 | 0.106 | 0.119 | 0.119 | 0.120 |
| (FOV × F)/H | 57.106 | 57.161 | 56.111 | 56.900 | 57.100 | 57.096 |
| T23/TTL | 0.003 | 0.003 | 0.003 | 0.003 | 0.003 | 0.003 |
| F/H | 1.830 | 1.832 | 1.798 | 1.824 | 1.830 | 1.830 |
| DSR3/T12 | 0.014 | 0.014 | −0.033 | 0.000 | 0.000 | 0.000 |
| \|F1/F\| | 3.687 | 3.667 | 2.436 | 3.374 | 3.562 | 3.485 |
| \|F1/F2\| | 4.245 | 4.226 | 3.544 | 4.227 | 4.449 | 4.328 |
| \|(R4 − R5)/(R4 + R5)\| | 3.680 | 3.604 | −6.871 | 3.046 | 3.987 | 4.001 |
| \|R1/R2\| | 1.473 | 1.473 | 1.504 | 0.776 | 0.796 | 0.790 |
| T12/TTL | 0.204 | 0.204 | 0.173 | 0.198 | 0.240 | 0.231 |

Embodiment 7

Figure 7:
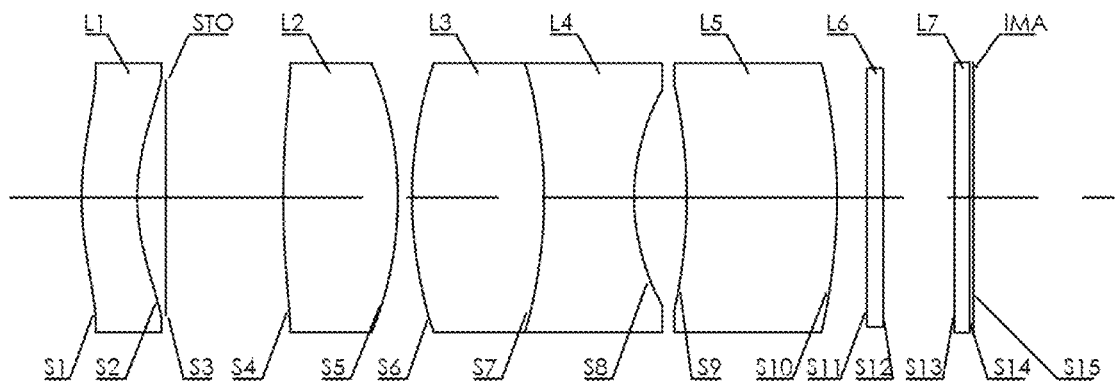
FIG. 7 illustrates a schematic structural view of an optical lens assembly according to embodiment 7 of the present disclosure.

An optical lens assembly according to Embodiment 7 of the present disclosure is described below with reference to FIG. 7. FIG. 7 illustrates a schematic structural view of the optical lens assembly according to Embodiment 7 of the present disclosure.

As shown in FIG. 7, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a convex surface, and an image-side surface S2 of the first lens is a concave surface. The second lens L2 is a biconvex lens having positive refractive power, an object-side surface S4 of the second lens is a convex surface, and an image-side surface S5 of the second lens is a convex surface. The third lens L3 is a biconvex lens having positive refractive power, an object-side surface S6 of the third lens is a convex surface, and an image-side surface S7 of the third lens is a convex surface. The fourth lens L4 is a biconcave lens having negative refractive power, an object-side surface S7 of the fourth lens is a concave surface, and an image-side surface S8 of the fourth lens is a concave surface. The fifth lens L5 is a meniscus lens having negative refractive power, an object-side surface S9 of the fifth lens is a concave surface, and an image-side surface S10 of the fifth lens is a convex surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S2 of the first lens L1.

In the present embodiment, the object-side surface S1 and the image-side surface S2 of the first lens L1 and the object-side surface S4 and the image-side surface S5 of the second lens L2 may be aspheric.

Alternatively, the optical lens assembly may further include an optical filter OF having an object-side surface S11 and an image-side surface S12 and a cover glass CG having an object-side surface S13 and an image-side surface S14. The optical filter OF may be used to correct color deviations. The cover glass CG may be used to protect an image sensor chip IMA located on an imaging plane S15. Light from an object sequentially passes through the respective surfaces S1 to S14 and finally images on the imaging plane S15.

Table 20 shows the radius of curvature R, the thickness T (it should be understood that the thickness T in the row S1 is the center thickness of the first lens L1, and the thickness T in the row S2 is the air space between the first lens L1 and the second lens L2, and so on), the refractive index Nd, and the abbe number Vd of each lens of the optical lens assembly of embodiment 7.

TABLE 20

| Surface number | Radius of curvature R (mm) | Thickness T (mm) | Refractive index Nd | Abbe number Vd |
|---|---|---|---|---|
| S1 | 10.3487 | 1.8500 | 1.59 | 63.25 |
| S2 | 6.8457 | 0.9491 | | |
| ST0 | Infinite | 3.9173 | | |
| S4 | 29.6908 | 3.8175 | 1.69 | 63.41 |
| S5 | −12.2196 | 0.4809 | | |
| S6 | 14.4203 | 4.3873 | 1.57 | 57.51 |
| S7 | −16.1011 | 3.0115 | 1.50 | 25.89 |
| S8 | 7.3798 | 1.7424 | | |
| S9 | −17.2551 | 5.0013 | 1.70 | 27.25 |
| S10 | −19.8898 | 1.0000 | | |
| S11 | Infinite | 0.5500 | 1.52 | 64.21 |
| S12 | Infinite | 2.3764 | | |
| S13 | Infinite | 0.5000 | 1.52 | 64.21 |
| S14 | Infinite | 0.1250 | | |
| IMA | Infinite | | | |

Table 21 below shows the conic coefficient K and the high-order coefficients A, B, C, D and E applicable to aspheric surfaces S1, S2, S4 and S5 in embodiment 7.

TABLE 21

| Surface number | K | A | B | C | D | E |
|---|---|---|---|---|---|---|
| S1 | 0.1476 | −1.1945E−03 | −1.6293E−05 | 5.3488E−07 | −1.3831E−08 | 2.0354E−10 |
| S2 | 0.0325 | −1.6669E−03 | −2.3607E−05 | 9.5918E−07 | −2.6409E−08 | 3.0588E−10 |
| S4 | 0.3973 | −1.2124E−04 | −3.0830E−06 | −1.6891E−07 | 3.0946E−09 | −1.1695E−10 |
| S5 | 0.0179 | 1.9149E−05 | −1.7611E−06 | −5.9220E−08 | −5.9614E−10 | −1.4531E−11 |

Embodiment 8

Figure 8:
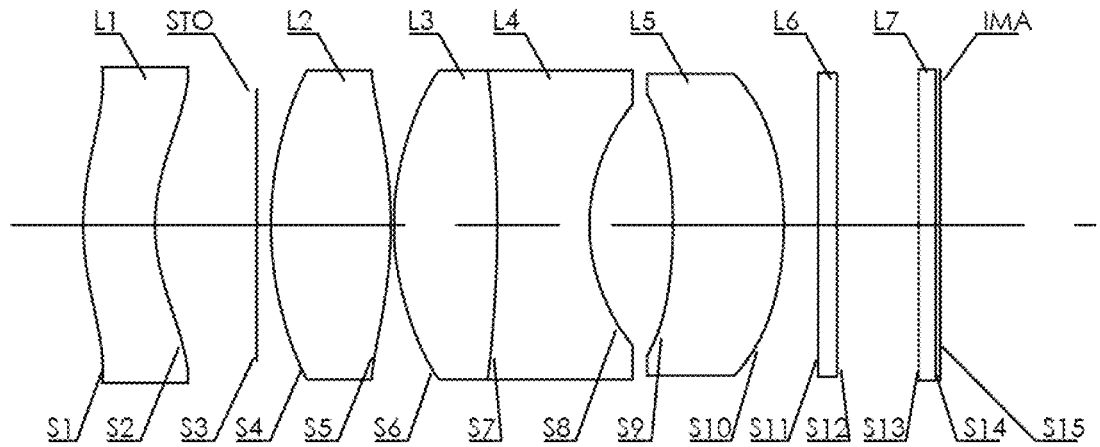
FIG. 8 illustrates a schematic structural view of an optical lens assembly according to embodiment 8 of the present disclosure.

An optical lens assembly according to Embodiment 8 of the present disclosure is described below with reference to FIG. 8. In this Embodiment and the following Embodiments, the description same as in Embodiment 7 will be omitted for brevity. FIG. 8 illustrates a schematic structural view of the optical lens assembly according to Embodiment 8 of the present disclosure.

As shown in FIG. 8, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a convex surface, and an image-side surface S2 of the first lens is a concave surface. The second lens L2 is a biconvex lens having positive refractive power, an object-side surface S4 of the second lens is a convex surface, and an image-side surface S5 of the second lens is a convex surface. The third lens L3 is a biconvex lens having positive refractive power, an object-side surface S6 of the third lens is a convex surface, and an image-side surface S7 of the third lens is a convex surface. The fourth lens L4 is a biconcave lens having negative refractive power, an object-side surface S7 of the fourth lens is a concave surface, and an image-side surface S8 of the fourth lens is a concave surface. The fifth lens L5 is a meniscus lens having positive refractive power, an object-side surface S9 of the fifth lens is a concave surface, and an image-side surface S10 of the fifth lens is a convex surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S4 of the second lens L2.

In the present embodiment, the object-side surface S1 and the image-side surface S2 of the first lens L1, the object-side surface S4 and the image-side surface S5 of the second lens L2 and the object-side surface S9 and the image-side surface S10 of the fifth lens L5 may each be aspheric.

Alternatively, the optical lens assembly may further include an optical filter OF having an object-side surface S11 and an image-side surface S12 and a cover glass CG having an object-side surface S13 and an image-side surface S14. The optical filter OF may be used to correct color deviations. The cover glass CG may be used to protect an image sensor chip IMA located on an imaging plane S15. Light from an object sequentially passes through the respective surfaces S1 to S14 and finally images on the imaging plane S15.

Table 22 shows the radius of curvature R, the thickness T, the refractive index Nd, and the abbe number Vd of each lens of the optical lens assembly of Embodiment 8.

TABLE 22

| Surface number | Radius of curvature R (mm) | Thickness T (mm) | Refractive index Nd | Abbe number Vd |
|---|---|---|---|---|
| S1 | 8.0152 | 2.0876 | 1.63 | 57.56 |
| S2 | 5.2402 | 2.9660 | | |
| ST0 | Infinite | 0.4097 | | |
| S4 | 10.0321 | 3.4883 | 1.60 | 64.70 |
| S5 | −12.8979 | 0.1000 | | |
| S6 | 8.4685 | 2.9937 | 1.61 | 40.95 |
| S7 | −36.4575 | 2.6974 | 1.88 | 24.47 |
| S8 | 5.5332 | 2.4196 | | |
| S9 | −15.2924 | 3.2239 | 1.70 | 32.30 |
| S10 | −9.6869 | 1.0000 | | |
| S11 | Infinite | 0.5500 | 1.52 | 64.21 |
| S12 | Infinite | 2.3764 | | |
| S13 | Infinite | 0.5000 | 1.52 | 64.21 |
| S14 | Infinite | 0.1250 | | |
| IMA | Infinite | | | |

Table 23 below shows the conic coefficient K and the high-order coefficients A, B, C, D and E applicable to aspheric surfaces S1, S2, S4, S5, S9 and S10 in Embodiment 8.

TABLE 21

| Surface number | K | A | B | C | D | E |
|---|---|---|---|---|---|---|
| S1 | −0.1723 | −1.6573E−03 | −2.3491E−05 | 5.3021E−07 | −4.3832E−09 | 6.3671E−11 |
| S2 | −0.1911 | −3.0158E−03 | −3.4045E−05 | 1.3726E−06 | −1.7734E−08 | −3.5995E−10 |
| S4 | −42.3238 | 3.9503E−03 | −3.7269E−04 | 2.3639E−05 | −8.1263E−07 | 1.1885E−08 |
| S5 | 0.5336 | 4.2256E−04 | −1.2620E−06 | 1.1565E−06 | −7.0687E−08 | 2.2078E−09 |
| S9 | 13.2218 | −4.6476E−04 | −1.4235E−05 | 3.6188E−06 | −5.1263E−07 | 2.7988E−08 |
| S10 | 2.6343 | −3.6322E−04 | −5.4850E−06 | 6.0978E−07 | −4.0848E−08 | 1.4371E−09 |

Embodiment 9

Figure 9:
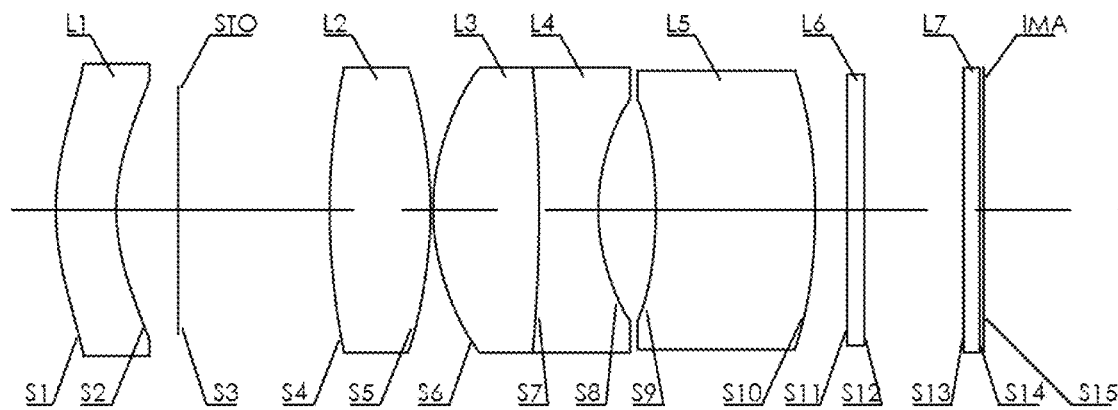
FIG. 9 illustrates a schematic structural view of an optical lens assembly according to embodiment 9 of the present disclosure.

An optical lens assembly according to Embodiment 9 of the present disclosure is described below with reference to FIG. 9. FIG. 9 illustrates a schematic structural view of the optical lens assembly according to Embodiment 9 of the present disclosure.

As shown in FIG. 9, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a convex surface, and an image-side surface S2 of the first lens is a concave surface. The second lens L2 is a biconvex lens having positive refractive power, an object-side surface S4 of the second lens is a convex surface, and an image-side surface S5 of the second lens is a convex surface. The third lens L3 is a biconvex lens having positive refractive power, an object-side surface S6 of the third lens is a convex surface, and an image-side surface S7 of the third lens is a convex surface. The fourth lens L4 is a biconcave lens having negative refractive power, an object-side surface S7 of the fourth lens is a concave surface, and an image-side surface S8 of the fourth lens is a concave surface. The fifth lens L5 is a meniscus lens having negative refractive power, an object-side surface S9 of the fifth lens is a concave surface, and an image-side surface S10 of the fifth lens is a convex surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S2 of the first lens L1.

In the present embodiment, the object-side surface S1 and the image-side surface S2 of the first lens L1 and the object-side surface S9 and the image-side surface S10 of the fifth lens L5 may be aspheric.

Alternatively, the optical lens assembly may further include an optical filter OF having an object-side surface S11 and an image-side surface S12 and a cover glass CG having an object-side surface S13 and an image-side surface S14. The optical filter OF may be used to correct color deviations. The cover glass CG may be used to protect an image sensor chip IMA located on an imaging plane S15. Light from an object sequentially passes through the respective surfaces S1 to S14 and finally images on the imaging plane S15.

Table 24 shows the radius of curvature R, the thickness T, the refractive index Nd, and the abbe number Vd of each lens of the optical lens assembly of embodiment 9.

TABLE 24

| Surface number | Radius of curvature R (mm) | Thickness T (mm) | Refractive index Nd | Abbe number Vd |
|---|---|---|---|---|
| S1 | 8.3950 | 1.8958 | 1.59 | 55.41 |
| S2 | 6.3181 | 1.9445 | | |
| ST0 | Infinite | 4.7599 | | |
| S4 | 22.6107 | 3.1507 | 1.62 | 63.04 |
| S5 | −14.8456 | 0.1000 | | |
| S6 | 7.6717 | 3.3101 | 1.64 | 55.19 |
| S7 | −50.2952 | 1.8692 | 1.76 | 27.65 |
| S8 | 6.6928 | 1.7942 | | |
| S9 | −14.9853 | 5.0042 | 1.69 | 31.08 |
| S10 | −19.8862 | 1.0000 | | |
| S11 | Infinite | 0.5500 | 1.52 | 64.21 |
| S12 | Infinite | 3.1103 | | |
| S13 | Infinite | 0.5000 | 1.52 | 64.21 |
| S14 | Infinite | 0.1250 | | |
| IMA | Infinite | | | |

Table 25 below shows the conic coefficient K and the high-order coefficients A, B, C, D and E applicable to aspheric surfaces S1, S2, S9 and S10 in embodiment 9.

TABLE 25

| Surface number | K | A | B | C | D | E |
|---|---|---|---|---|---|---|
| S1 | −0.1226 | −9.3075E−04 | −1.1729E−05 | 3.4568E−07 | −1.0454E−08 | 1.9249E−10 |
| S2 | −0.0250 | −1.4403E−03 | −1.9229E−05 | 8.6547E−07 | −3.5577E−08 | 6.1229E−10 |
| S9 | 1.1787 | −9.8037E−04 | 3.1404E−07 | −1.8226E−06 | 2.1966E−07 | −6.3914E−09 |
| 510 | −1.5195 | −5.4474E−04 | 4.1466E−06 | 7.5017E−08 | 1.3295E−08 | −3.7659E−10 |

Embodiment 10

Figure 10:
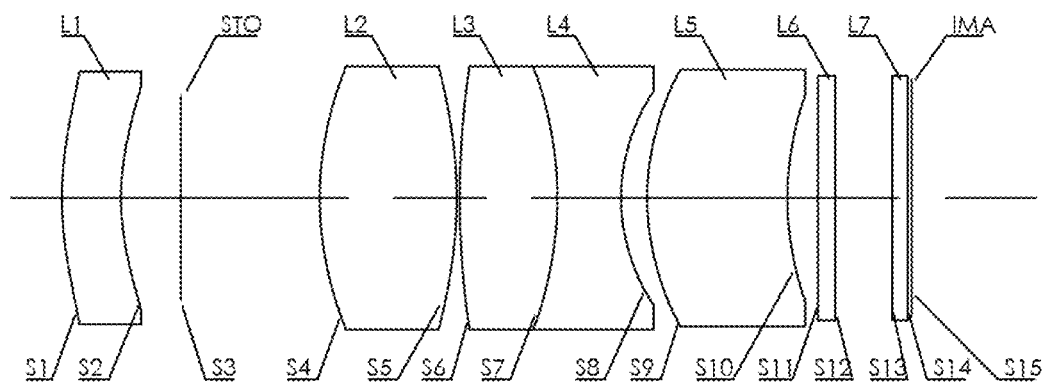
FIG. 10 illustrates a schematic structural view of an optical lens assembly according to embodiment 10 of the present disclosure.

An optical lens assembly according to Embodiment 10 of the present disclosure is described below with reference to FIG. 10. FIG. 10 illustrates a schematic structural view of the optical lens assembly according to Embodiment 10 of the present disclosure.

As shown in FIG. 10, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a convex surface, and an image-side surface S2 of the first lens is a concave surface. The second lens L2 is a biconvex lens having positive refractive power, an object-side surface S4 of the second lens is a convex surface, and an image-side surface S5 of the second lens is a convex surface. The third lens L3 is a biconvex lens having positive refractive power, an object-side surface S6 of the third lens is a convex surface, and an image-side surface S7 of the third lens is a convex surface. The fourth lens L4 is a biconcave lens having negative refractive power, an object-side surface S7 of the fourth lens is a concave surface, and an image-side surface S8 of the fourth lens is a concave surface. The fifth lens L5 is a meniscus lens having positive refractive power, an object-side surface S9 of the fifth lens is a convex surface, and an image-side surface S10 of the fifth lens is a concave surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S2 of the first lens L1.

In the present embodiment, the object-side surface S1 and the image-side surface S2 of the first lens L1 and the object-side surface S4 and the image-side surface S5 of the second lens L2 each may be aspheric.

Alternatively, the optical lens assembly may further include an optical filter OF having an object-side surface S11 and an image-side surface S12 and a cover glass CG having an object-side surface S13 and an image-side surface S14. The optical filter OF may be used to correct color deviations. The cover glass CG may be used to protect an image sensor chip IMA located on an imaging plane S15. Light from an object sequentially passes through the respective surfaces S1 to S14 and is finally imaged on the imaging plane S15.

Table 26 shows the radius of curvature R, the thickness T, the refractive index Nd, and the abbe number Vd of each lens of the optical lens assembly of embodiment 10.

TABLE 26

| Surface number | Radius of curvature R (mm) | Thickness T (mm) | Refractive index Nd | Abbe number Vd |
|---|---|---|---|---|
| S1 | 11.1342 | 1.9323 | 1.55 | 57.53 |
| S2 | 8.5121 | 1.9601 | | |
| ST0 | Infinite | 4.5332 | | |
| S4 | 10.7852 | 4.4772 | 1.63 | 66.82 |
| S5 | −14.3149 | 0.1000 | | |
| S6 | 28.9920 | 3.1828 | 1.62 | 74.77 |
| S7 | −12.0265 | 2.0968 | 1.67 | 32.18 |
| S8 | 6.2599 | 0.8561 | | |
| S9 | 8.6319 | 4.5779 | 1.84 | 29.03 |
| S10 | 10.0612 | 1.0000 | | |
| S11 | Infinite | 0.5500 | 1.52 | 64.21 |
| S12 | Infinite | 1.8764 | | |
| S13 | Infinite | 0.5000 | 1.52 | 64.21 |
| S14 | Infinite | 0.1250 | | |
| IMA | Infinite | | | |

Table 27 below shows the conic coefficient K and the high-order coefficients A, B, C, D and E applicable to aspheric surfaces S1, S2, S4 and S5 in Embodiment 10.

TABLE 27

| Surface number | K | A | B | C | D | E |
|---|---|---|---|---|---|---|
| S1 | −8.3387 | 1.1188E−04 | −2.5878E−05 | 6.6601E−07 | −1.9024E−08 | 2.9249E−10 |
| S2 | −0.4497 | −7.2148E−04 | −9.4785E−06 | 2.4955E−07 | −1.0095E−08 | 2.2587E−10 |
| S4 | −0.0386 | −8.9677E−05 | 2.1440E−07 | −1.8017E−08 | 6.8690E−10 | −5.0780E−12 |
| S5 | −1.2610 | 1.6358E−04 | 4.7916E−08 | −1.2747E−08 | 7.1537E−10 | −5.9593E−12 |

Embodiment 11

Figure 11:
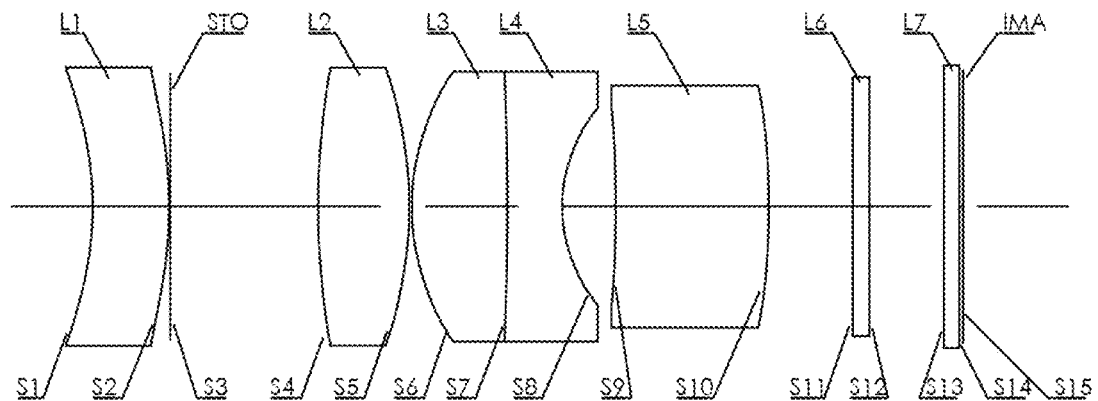
FIG. 11 illustrates a schematic structural view of an optical lens assembly according to embodiment 11 of the present disclosure.

An optical lens assembly according to Embodiment 11 of the present disclosure is described below with reference to FIG. 11. FIG. 11 illustrates a schematic structural view of the optical lens assembly according to Embodiment 11 of the present disclosure.

As shown in FIG. 11, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a concave surface, and an image-side surface S2 of the first lens is a convex surface. The second lens L2 is a biconvex lens having positive refractive power, an object-side surface S4 of the second lens is a convex surface, and an image-side surface S5 of the second lens is a convex surface. The third lens L3 is a biconvex lens having positive refractive power, an object-side surface S6 of the third lens is a convex surface, and an image-side surface S7 of the third lens is a convex surface. The fourth lens L4 is a biconcave lens having negative refractive power, an object-side surface S7 of the fourth lens is a concave surface, and an image-side surface S8 of the fourth lens is a concave surface. The fifth lens L5 is a meniscus lens having positive refractive power, an object-side surface S9 of the fifth lens is a concave surface, and an image-side surface S10 of the fifth lens is a convex surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S2 of the first lens L1.

In the present embodiment, the object-side surface S1 and the image-side surface S2 of the first lens L1 and the object-side surface S9 and the image-side surface S10 of the fifth lens L5 each may be aspheric.

Alternatively, the optical lens assembly may further include an optical filter OF having an object-side surface S11 and an image-side surface S12 and a cover glass CG having an object-side surface S13 and an image-side surface S14. The optical filter OF may be used to correct color deviations. The cover glass CG may be used to protect an image sensor chip IMA located on an imaging plane S15. Light from an object sequentially passes through the respective surfaces S1 to S14 and is finally imaged on the imaging plane S15.

Table 28 shows the radius of curvature R, the thickness T, the refractive index Nd, and the abbe number Vd of each lens of the optical lens assembly of embodiment 11.

TABLE 28

| Surface number | Radius of curvature R (mm) | Thickness T (mm) | Refractive index Nd | Abbe number Vd |
|---|---|---|---|---|
| S1 | −10.9072 | 2.4962 | 1.59 | 61.17 |
| S2 | −13.8437 | 0.0365 | | |
| ST0 | Infinite | 4.8271 | | |
| S4 | 25.8416 | 2.9648 | 1.61 | 66.66 |
| S5 | −13.7344 | 0.1000 | | |
| S6 | 7.8967 | 3.1069 | 1.64 | 49.46 |
| S7 | −103.9180 | 1.7992 | 1.76 | 27.55 |
| S8 | 5.0453 | 1.7333 | | |
| S9 | −54.5695 | 5.0011 | 1.72 | 31.71 |
| S10 | −27.4251 | 2.7376 | | |
| S11 | Infinite | 0.5500 | 1.52 | 64.21 |
| S12 | Infinite | 2.0000 | | |
| S13 | Infinite | 0.5000 | 1.52 | 64.21 |
| S14 | Infinite | 0.5509 | | |
| IMA | Infinite | | | |

Table 29 below shows the conic coefficient K and the high-order coefficients A, B, C, D and E applicable to aspheric surfaces S1, S2, S9 and S10 in embodiment 11.

TABLE 29

| Surface number | K | A | B | C | D | E |
|---|---|---|---|---|---|---|
| S1 | 0.0002 | 1.4619E−04 | 6.6430E−06 | −7.1023E−08 | 4.1090E−09 | −9.6544E−11 |
| S2 | −0.1099 | 2.5803E−04 | 6.6405E−06 | −1.0307E−07 | 6.7656E−09 | −1.1955E−10 |
| S9 | −86.5500 | −2.9169E−04 | 4.4067E−06 | −2.7553E−06 | 2.3171E−07 | −9.0968E−09 |
| S10 | −14.1873 | −2.0187E−04 | −7.3405E−06 | −1.5609E−07 | 9.2933E−09 | −3.5692E−10 |

In view of the above, Embodiments 7 to 11 respectively satisfy the relationships shown in Table 30 below. In Table 11, the units of SL, TTL, F, BFL, TL, H, F2-F4, F34, ΣCT, DSR3 are millimeter (mm), and the unit of FOV is degree (°).

TABLE 30

| Condition/Embodiment | 7 | 8 | 9 | 10 | 11 |
|---|---|---|---|---|---|
| D | 9.000 | 9.200 | 9.220 | 8.259 | 9.108 |
| H | 9.002 | 9.002 | 9.002 | 7.786 | 8.932 |
| FOV | 31.2 | 31.2 | 31.2 | 31.2 | 31.2 |
| TTL | 29.709 | 24.937 | 29.120 | 27.768 | 28.404 |
| F | 16.416 | 16.049 | 16.632 | 14.018 | 16.004 |
| BFL | 3.551 | 3.551 | 4.255 | 4.051 | 6.339 |
| TL | 26.157 | 21.386 | 24.835 | 23.716 | 22.065 |
| F1 | −42.476 | −33.898 | −65.360 | −88.429 | −127.172 |
| F2 | 12.938 | 10.013 | 14.933 | 10.388 | 15.007 |
| F3 | 14.006 | 11.510 | 10.621 | 14.185 | 11.571 |
| F4 | −9.696 | −5.270 | −7.654 | −5.811 | −6.278 |
| F34 | −94.436 | −17.385 | −320.201 | −11.787 | −28.523 |
| F5 | −863.771 | 30.435 | −150.686 | 29.177 | 70.649 |
| R1 | 10.349 | 8.015 | 8.395 | 11.134 | −10.907 |
| R2 | 6.846 | 5.240 | 6.318 | 8.512 | −13.844 |
| d1 | 1.850 | 2.088 | 1.896 | 1.932 | 2.496 |
| R3 | / | / | / | / | / |
| R4 | 29.691 | 10.032 | 22.611 | 10.785 | 2.965 |
| R5 | −12.220 | −12.898 | −14.846 | −14.315 | 0.100 |
| T1x | / | / | / | / | / |
| T12 | 4.866 | 3.376 | 6.704 | 6.493 | 4.864 |
| T23 | 0.481 | 0.100 | 0.100 | 0.100 | 0.100 |
| T45 | 1.742 | 2.420 | 1.794 | 0.856 | 1.733 |
| SL | 22.992 | 19.474 | 20.514 | 19.342 | 21.044 |
| CT2 | 3.818 | 3.488 | 3.151 | 4.477 | 2.965 |
| Nd3 | 1.57 | 1.61 | 1.64 | 1.62 | 1.64 |
| Nd4 | 1.50 | 1.88 | 1.76 | 1.68 | 1.76 |
| Vd4 | 25.89 | 24.47 | 27.65 | 32.18 | 27.55 |
| Vd3 | 57.51 | 40.95 | 55.19 | 74.77 | 49.46 |
| ΣCT | 18.068 | 14.491 | 15.230 | 16.267 | 15.368 |
| DSR3 | 3.917 | 4.760 | 4.760 | 4.533 | 4.827 |

TABLE 30-continued

| Condition/Embodiment | 7 | 8 | 9 | 10 | 11 |
|---|---|---|---|---|---|
| D/H/FOV | 0.032 | 0.033 | 0.033 | 0.034 | 0.033 |
| TTL/F | 1.809 | 1.554 | 1.751 | 1.981 | 1.775 |
| T45/TTL | 0.059 | 0.097 | 0.062 | 0.031 | 0.061 |
| BFL/TL | 0.136 | 0.166 | 0.171 | 0.171 | 0.287 |
| BFL/TTL | 0.120 | 0.142 | 0.146 | 0.146 | 0.223 |
| max{dn/dm} 1~5 | 2.703 | 1.671 | 2.677 | 2.369 | 2.780 |
| max{dn/dm} 2~5 | 1.661 | 1.293 | 2.677 | 2.183 | 2.780 |
| |F3/F4| | 1.445 | 2.184 | 1.388 | 2.441 | 1.843 |
| |F4/F3| | 0.692 | 0.458 | 0.721 | 0.410 | 0.543 |
| |F34/F| | 5.752 | 1.083 | 19.252 | 0.841 | 1.782 |
| |F/F34| | 0.174 | 0.923 | 0.052 | 1.189 | 0.561 |
| (R2 + d1)/R1 | 0.840 | 0.914 | 0.978 | 0.938 | 1.040 |
| T23/TTL | 0.016 | 0.004 | 0.003 | 0.004 | 0.004 |
| F5/F | −52.608 | 1.896 | −9.060 | 2.081 | 4.414 |
| (R2 − R3)/(R2 + R3) | / | / | / | / | / |
| T1x/T12 | / | / | / | / | / |

TABLE 30-continued

| Condition/Embodiment | 7 | 8 | 9 | 10 | 11 |
|---|---|---|---|---|---|
| SL/TTL | 0.774 | 0.781 | 0.704 | 0.697 | 0.741 |
| CT2/T12 | 0.784 | 1.033 | 0.470 | 0.690 | 0.610 |
| Nd2 | 1.70 | 1.60 | 1.62 | 1.64 | 1.61 |
| F2/F | 0.788 | 0.624 | 0.898 | 0.741 | 0.938 |
| Nd3/Nd4 | 1.048 | 0.855 | 0.934 | 0.964 | 0.933 |
| Vd4/Vd3 | 0.450 | 0.598 | 0.501 | 0.430 | 0.557 |
| ΣCT/TTL | 0.608 | 0.581 | 0.523 | 0.586 | 0.541 |
| F3/F | 0.853 | 0.717 | 0.639 | 1.012 | 0.723 |
| TTL/H/FOV | 0.106 | 0.089 | 0.104 | 0.114 | 0.102 |
| (FOV × F)/H | 56.906 | 55.624 | 57.646 | 56.174 | 55.903 |
| T23/TTL | 0.016 | 0.004 | 0.003 | 0.004 | 0.004 |
| F/H | 1.824 | 1.783 | 1.848 | 1.800 | 1.792 |
| DSR3/T12 | 0.805 | 1.410 | 0.710 | 0.698 | 0.992 |
| |F1/F| | 2.587 | 2.112 | 3.930 | 6.308 | 7.946 |
| |F1/F2| | 3.283 | 3.385 | 4.377 | 8.513 | 8.474 |
| |(R4 − R5)/(R4 + R5)| | 2.399 | −8.001 | 4.824 | −7.111 | 0.935 |
| |R1/R2| | 1.512 | 1.530 | 1.329 | 1.308 | 0.788 |
| T12/TTL | 0.164 | 0.135 | 0.230 | 0.234 | 0.171 |

Embodiment 12

Figure 12:
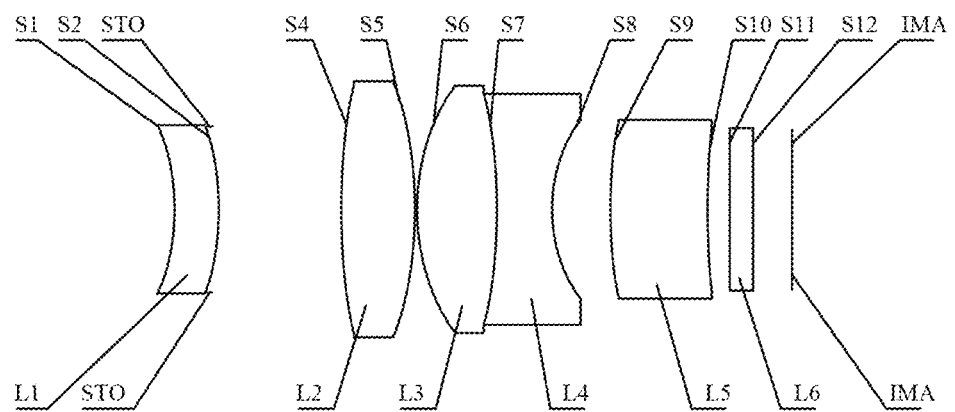
FIG. 12 illustrates a schematic structural view of an optical lens assembly according to embodiment 12 of the present disclosure.

An optical lens assembly according to Embodiment 12 of the present disclosure is described below with reference to FIG. 12. FIG. 12 illustrates a schematic structural view of the optical lens assembly according to Embodiment 12 of the present disclosure.

As shown in FIG. 12, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a concave surface, and an image-side surface S2 of the first lens is a convex surface. The second lens L2 is a biconvex lens having positive refractive power, an object-side surface S4 of the second lens is a convex surface, and an image-side surface S5 of the second lens is a convex surface. The third lens L3 is a biconvex lens having positive refractive power, an object-side surface S6 of the third lens is a convex surface, and an image-side surface S7 of the third lens is a convex surface. The fourth lens L4 is a biconcave lens having negative refractive power, an object-side surface S7 of the fourth lens is a concave surface, and an image-side surface S8 of the fourth lens is a concave surface. The fifth lens L5 is a meniscus lens having positive refractive power, an object-side surface S9 of the fifth lens is a convex surface, and an image-side surface S10 of the fifth lens is a concave surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S2 of the first lens L1.

In the present embodiment, both the object-side surface and the image-side surface of the first lens L1 and the fifth lens L5 may be aspheric.

Alternatively, the optical lens assembly may further include an optical filter L6 having an object-side surface S11 and an image-side surface S12 or a cover glass L6' (not shown). The optical filter L6 may be used to correct color deviations and the cover glass L6' may be used to protect an image sensor chip IMA located on an imaging plane. Light from an object sequentially passes through the respective surfaces S1 to S12 and is finally imaged on the image sensor chip IMA.

Table 31 shows the radius of curvature R, the thickness T (it should be understood that the thickness T in the row S1 is the center thickness of the first lens L1, and the thickness T in the row S2 is the air space d12 between the first lens L1 and the second lens L2, and so on), the refractive index Nd, and the abbe number Vd of each lens of the optical lens assembly of embodiment 12.

TABLE 31

| Surface number | Radius of curvature R (mm) | Thickness T (mm) | Refractive index Nd | Abbe number Vd |
|---|---|---|---|---|
| S1 | −9.4041 | 2.0000 | 1.59 | 61.25 |
| S2 | −11.3007 | −0.4026 | | |
| ST0 | Infinite | 5.9546 | | |
| S4 | 28.1420 | 3.3300 | 1.62 | 63.41 |
| S5 | −17.4580 | 0.1000 | | |
| S6 | 9.9700 | 3.6100 | 1.62 | 63.41 |
| S7 | −23.3900 | 2.5000 | 1.67 | 32.18 |
| S8 | 7.0000 | 2.6432 | | |
| S9 | 19.9963 | 4.4000 | 1.69 | 31.18 |
| S10 | 31.2574 | 1.0000 | | |
| S11 | Infinite | 1.0500 | 1.52 | 64.21 |
| S12 | Infinite | 1.7744 | | |
| IMA | Infinite | | | |

Table 32 below shows the conic coefficient K and the high-order coefficients A, B, C, D and E applicable to aspheric surfaces S1, S2, S9 and S10 in embodiment 12.

TABLE 32

| Surface number | K | A | B | C | D | E |
|---|---|---|---|---|---|---|
| S1 | 1.1417 | 2.2659E−04 | 8.1071E−06 | 5.7623E−08 | 1.4335E−09 | 3.1912E−11 |
| S2 | 0.4248 | 1.5838E−04 | 5.3593E−06 | −4.6926E−08 | 3.5064E−09 | −6.4820E−11 |
| S9 | 16.9736 | −2.9068E−04 | −9.2706E−06 | −6.8221E−07 | 3.8120E−08 | −1.7576E−09 |
| 510 | 42.9190 | −1.5483E−04 | −1.5656E−05 | −3.0863E−07 | 1.1839E−08 | −1.2314E−09 |

Embodiment 13

Figure 13:
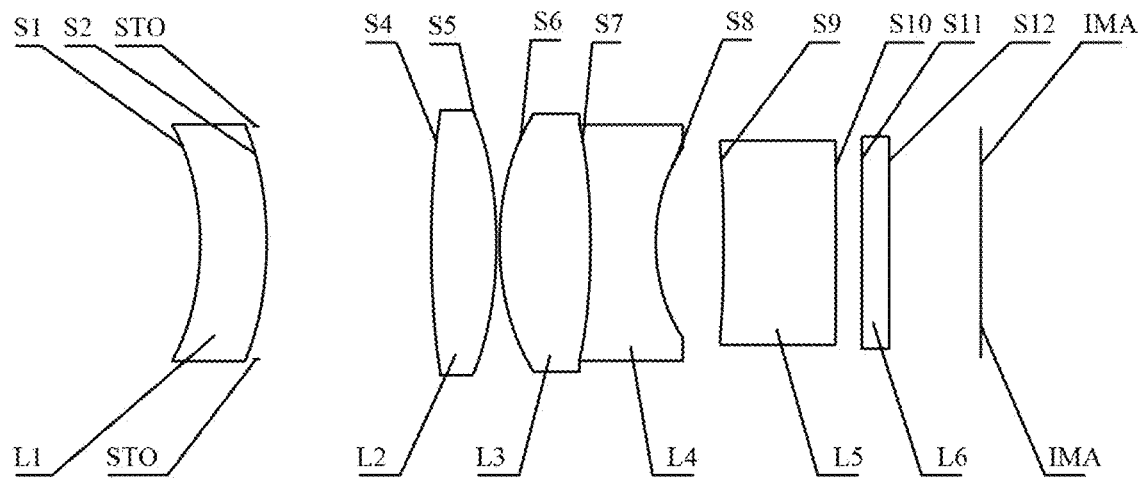
FIG. 13 illustrates a schematic structural view of an optical lens assembly according to embodiment 13 of the present disclosure.

An optical lens assembly according to Embodiment 13 of the present disclosure is described below with reference to FIG. 13. In this Embodiment and the following Embodiments, the description same as in Embodiment 12 will be omitted for brevity. FIG. 13 illustrates a schematic structural view of the optical lens assembly according to Embodiment 13 of the present disclosure.

As shown in FIG. 13, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a concave surface, and an image-side surface S2 of the first lens is a convex surface. The second lens L2 is a biconvex lens having positive refractive power, an object-side surface S4 of the second lens is a convex surface, and an image-side surface S5 of the second lens is a convex surface. The third lens L3 is a biconvex lens having positive refractive power, an object-side surface S6 of the third lens is a convex surface, and an image-side surface S7 of the third lens is a convex surface. The fourth lens L4 is a biconcave lens having negative refractive power, an object-side surface S7 of the fourth lens is a concave surface, and an image-side surface S8 of the fourth lens is a concave surface. The fifth lens L5 is a meniscus lens having positive refractive power, an object-side surface S9 of the fifth lens is a concave surface, and an image-side surface S10 of the fifth lens is a convex surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S2 of the first lens L1.

In the present embodiment, both the object-side surface and the image-side surface of the first lens L1 and the fifth lens L5 may be aspheric.

Alternatively, the optical lens assembly may further include an optical filter L6 having an object-side surface S11 and an image-side surface S12 or a cover glass L6' (not shown). The optical filter L6 may be used to correct color deviations and the cover glass L6' may be used to protect an image sensor chip IMA located on an imaging plane. Light from an object sequentially passes through the respective surfaces S1 to S12 and is finally imaged on the image sensor chip IMA.

Table 33 shows the radius of curvature R, the thickness T, the refractive index Nd, and the abbe number Vd of each lens of the optical lens assembly of embodiment 13.

TABLE 33

| Surface number | Radius of curvature R (mm) | Thickness T (mm) | Refractive index Nd | Abbe number Vd |
|---|---|---|---|---|
| S1 | −9.5055 | 2.5773 | 1.64 | 55.47 |
| S2 | −11.4787 | −0.4026 | | |
| ST0 | Infinite | 6.7944 | | |
| S4 | 36.0534 | 2.5237 | 1.62 | 63.41 |
| S5 | −14.8715 | 0.1229 | | |
| S6 | 10.1469 | 3.5290 | 1.62 | 63.41 |
| S7 | −24.5102 | 2.5312 | 1.67 | 32.18 |
| S8 | 6.9964 | 2.6350 | | |
| S9 | −75.5511 | 4.3567 | 1.74 | 28.25 |
| S10 | −246.5983 | 1.0087 | | |
| S11 | Infinite | 1.0500 | 1.52 | 64.21 |
| S12 | Infinite | 3.5664 | | |
| IMA | Infinite | | | |

Table 34 below shows the conic coefficient K and the high-order coefficients A, B, C, D and E applicable to aspheric surfaces S1, S2, S9 and S10 in Embodiment 13.

TABLE 34

| Surface number | K | A | B | C | D | E |
|---|---|---|---|---|---|---|
| S1 | 1.1556 | 2.2647E−04 | 9.1918E−06 | 6.8570E−08 | 3.3074E−09 | −4.1232E−11 |
| S2 | 0.3357 | 1.7024E−04 | 5.4228E−06 | −3.4714E−08 | 3.6235E−09 | −6.0890E−11 |
| S9 | −68.3375 | −1.9147E−04 | −1.0386E−06 | −6.1328E−07 | 3.6869E−08 | −8.2564E−10 |
| S10 | −200.0000 | 6.1190E−05 | −7.8046E−07 | −3.3757E−07 | 2.1435E−08 | −3.7813E−10 |

Embodiment 14

Figure 14:
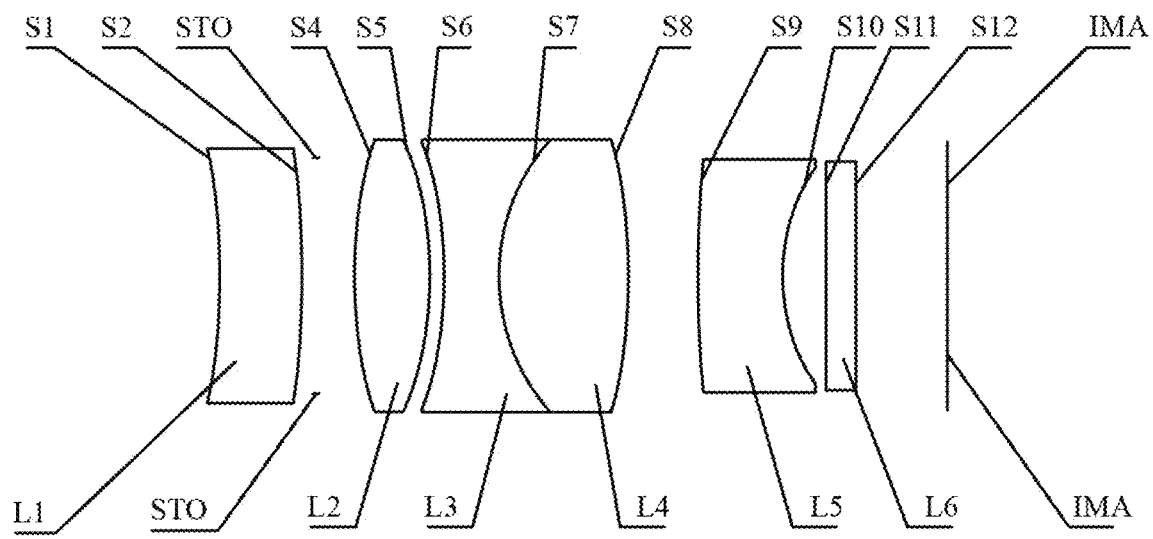
FIG. 14 illustrates a schematic structural view of an optical lens assembly according to embodiment 14 of the present disclosure.

An optical lens assembly according to Embodiment 14 of the present disclosure is described below with reference to FIG. 14. FIG. 14 illustrates a schematic structural view of the optical lens assembly according to Embodiment 14 of the present disclosure.

As shown in FIG. 14, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a concave surface, and an image-side surface S2 of the first lens is a convex surface. The second lens L2 is a biconvex lens having positive refractive power, an object-side surface S4 of the second lens is a convex surface, and an image-side surface S5 of the second lens is a convex surface. The third lens L3 is a biconcave lens having negative refractive power, an object-side surface S6 of the third lens is a concave surface, and an image-side surface S7 of the third lens is a concave surface. The fourth lens L4 is a biconvex lens having positive refractive power, an object-side surface S7 of the fourth lens is a convex surface, and an image-side surface S8 of the fourth lens is a convex surface. The fifth lens L5 is a meniscus lens having negative refractive power, an object-side surface S9 of the fifth lens is a convex surface, and an image-side surface S10 of the fifth lens is a concave surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S2 of the first lens L1.

In the present embodiment, both the object-side surface and the image-side surface of the first lens L1 and the fifth lens L5 may be aspheric.

Alternatively, the optical lens assembly may further include an optical filter L6 having an object-side surface S11 and an image-side surface S12 or a cover glass L6' (not shown). The optical filter L6 may be used to correct color deviations and the cover glass L6' may be used to protect an image sensor chip IMA located on an imaging plane. Light from an object sequentially passes through the respective surfaces S1 to S12 and is finally imaged on the image sensor chip IMA.

Table 35 shows the radius of curvature R, the thickness T, the refractive index Nd, and the abbe number Vd of each lens of the optical lens assembly of embodiment 14.

TABLE 35

| Surface number | Radius of curvature R (mm) | Thickness T (mm) | Refractive index Nd | Abbe number Vd |
|---|---|---|---|---|
| S1 | −47.5994 | 2.8826 | 1.59 | 61.16 |
| S2 | −52.7269 | 0.5000 | | |
| ST0 | Infinite | 1.3487 | | |
| S4 | 16.5369 | 2.6370 | 1.62 | 60.37 |
| S5 | −12.5699 | 0.5000 | | |
| S6 | −14.4792 | 1.9289 | 1.65 | 33.84 |
| S7 | 7.2294 | 4.5330 | 1.72 | 47.92 |
| S8 | −19.2769 | 2.4498 | | |
| S9 | 13.5148 | 2.9700 | 1.60 | 60.63 |
| S10 | 5.3000 | 1.5127 | | |
| S11 | Infinite | 1.0500 | 1.52 | 64.21 |
| S12 | Infinite | 3.2098 | | |
| IMA | Infinite | | | |

Table 36 below shows the conic coefficient K and the high-order coefficients A, B, C, D and E applicable to aspheric surfaces S1, S2, S9 and S10 in embodiment 14.

TABLE 36

| Surface number | K | A | B | C | D | E |
|---|---|---|---|---|---|---|
| S1 | 71.6939 | −4.9603E−04 | 1.5165E−06 | −4.7359E−08 | 5.9392E−09 | −3.4119E−11 |
| S2 | 99.0000 | −3.1818E−04 | 4.5980E−06 | 1.5661E−07 | −4.4997E−09 | 2.2727E−10 |

TABLE 36-continued

| Surface number | K | A | B | C | D | E |
|---|---|---|---|---|---|---|
| S9 | 5.3926 | −1.6960E−03 | −1.4345E−05 | −5.2670E−07 | 4.0181E−08 | −1.3345E−09 |
| S10 | 0.0413 | −1.9489E−03 | −1.5998E−05 | −7.3128E−07 | 8.1147E−08 | −3.7743E−09 |

Embodiment 15

Figure 15:
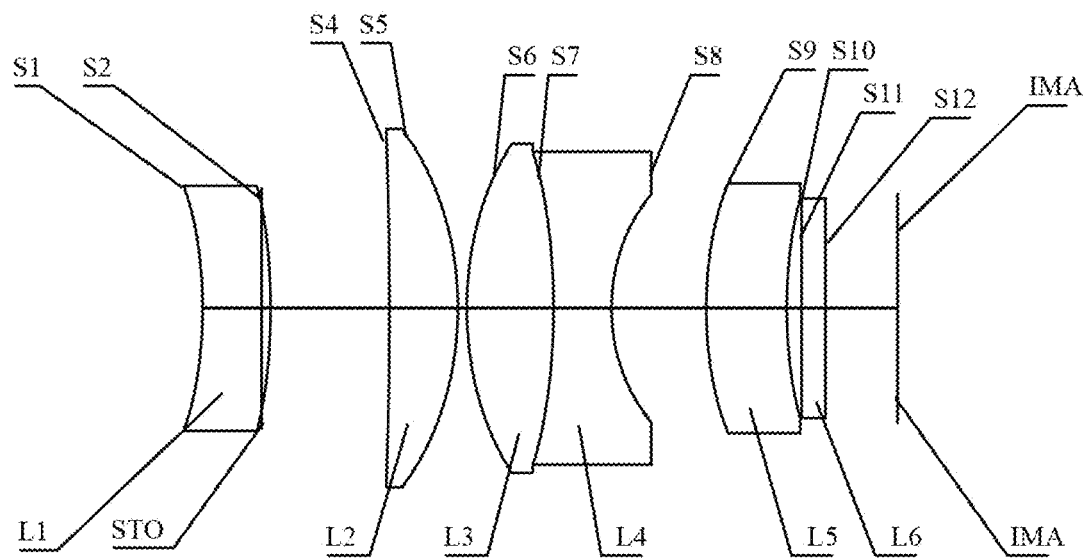
FIG. 15 illustrates a schematic structural view of an optical lens assembly according to embodiment 15 of the present disclosure.

An optical lens assembly according to Embodiment 15 of the present disclosure is described below with reference to FIG. 15. FIG. 15 illustrates a schematic structural view of the optical lens assembly according to Embodiment 15 of the present disclosure.

As shown in FIG. 15, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a concave surface, and an image-side surface S2 of the first lens is a convex surface. The second lens L2 is a meniscus lens having positive refractive power, an object-side surface S4 of the second lens is a concave surface, and an image-side surface S5 of the second lens is a convex surface. The third lens L3 is a biconvex lens having positive refractive power, an object-side surface S6 of the third lens is a convex surface, and an image-side surface S7 of the third lens is a convex surface. The fourth lens L4 is a biconcave lens having negative refractive power, an object-side surface S7 of the fourth lens is a concave surface, and an image-side surface S8 of the fourth lens is a concave surface. The fifth lens L5 is a meniscus lens having positive refractive power, an object-side surface S9 of the fifth lens is a convex surface, and an image-side surface S10 of the fifth lens is a concave surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S2 of the first lens L1.

In the present embodiment, both the object-side surface and the image-side surface of the first lens L1 and the fifth lens L5 may be aspheric.

Alternatively, the optical lens assembly may further include an optical filter L6 having an object-side surface S11 and an image-side surface S12 or a cover glass L6' (not shown). The optical filter L6 may be used to correct color deviations and the cover glass L6' may be used to protect an image sensor chip IMA located on an imaging plane. Light from an object sequentially passes through the respective surfaces S1 to S12 and is finally imaged on the image sensor chip IMA.

Table 37 shows the radius of curvature R, the thickness T, the refractive index Nd, and the abbe number Vd of each lens of the optical lens assembly of embodiment 15.

TABLE 37

| Surface number | Radius of curvature R (mm) | Thickness T (mm) | Refractive index Nd | Abbe number Vd |
|---|---|---|---|---|
| S1 | −10.7488 | 2.9733 | 1.74 | 44.90 |
| S2 | −12.8647 | −0.4026 | | |
| ST0 | Infinite | 5.5931 | | |
| S4 | −150.0000 | 3.0000 | 1.60 | 60.63 |
| S5 | −10.1586 | 0.3908 | | |
| S6 | 10.3575 | 3.7877 | 1.62 | 63.41 |
| S7 | −18.8635 | 2.5381 | 1.67 | 32.18 |
| S8 | 5.9409 | 4.1410 | | |
| S9 | 15.5613 | 3.5281 | 1.75 | 35.02 |
| S10 | 22.2277 | 0.6389 | | |
| S11 | Infinite | 1.0500 | 1.52 | 64.21 |
| S12 | Infinite | 3.1538 | | |
| IMA | Infinite | | | |

Table 38 below shows the conic coefficient K and the high-order coefficients A, B, C, D and E applicable to aspheric surfaces S1, S2, S9 and S10 in embodiment 15.

TABLE 38

| Surface number | K | A | B | C | D | E |
|---|---|---|---|---|---|---|
| S1 | 0.7933 | 3.0421E−04 | 1.0160E−05 | −5.0428E−08 | 9.5409E−10 | −3.4494E−11 |
| S2 | −1.0930 | 3.0023E−04 | 7.2448E−06 | 2.6079E−08 | 8.1206E−10 | 4.8022E−12 |
| S9 | 5.5363 | 2.4654E−04 | 1.2168E−06 | 1.9132E−07 | −9.8778E−09 | 2.2207E−10 |
| S10 | 21.3948 | 3.3386E−04 | 1.5573E−06 | 1.0879E−07 | −7.3063E−10 | −2.6058E−10 |

Embodiment 16

Figure 16:
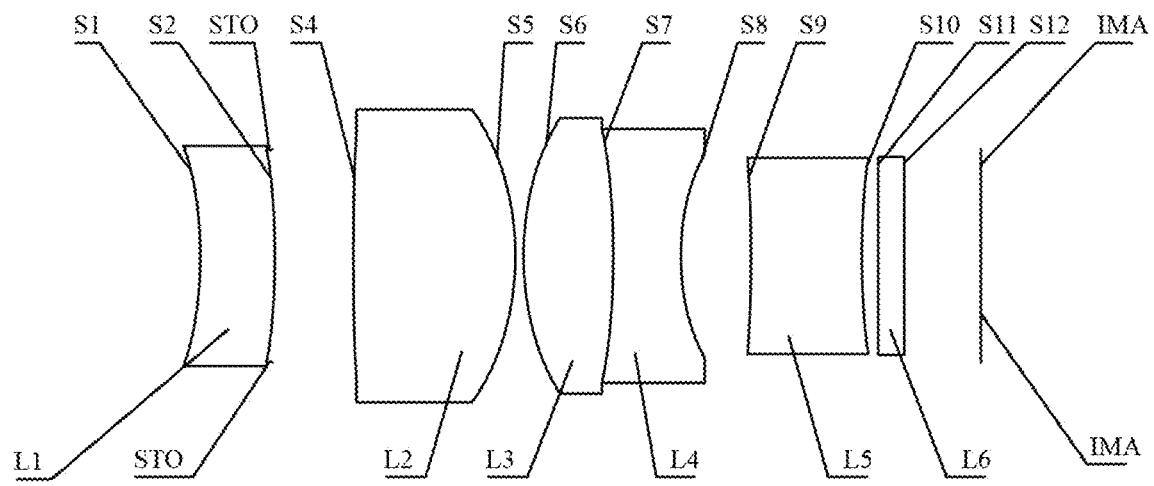
FIG. 16 illustrates a schematic structural view of an optical lens assembly according to embodiment 16 of the present disclosure

An optical lens assembly according to Embodiment 16 of the present disclosure is described below with reference to FIG. 16. FIG. 16 illustrates a schematic structural view of the optical lens assembly according to Embodiment 16 of the present disclosure.

As shown in FIG. 16, the optical lens assembly includes a first lens L1, a second lens L2, a third lens L3, a fourth lens L4 and a fifth lens L5, which are sequentially arranged from an object side to an image side along an optical axis.

The first lens L1 is a meniscus lens having negative refractive power, an object-side surface S1 of the first lens is a concave surface, and an image-side surface S2 of the first lens is a convex surface. The second lens L2 is a biconvex lens having positive refractive power, an object-side surface S4 of the second lens is a convex surface, and an image-side surface S5 of the second lens is a convex surface. The third lens L3 is a biconvex lens having positive refractive power, an object-side surface S6 of the third lens is a convex surface, and an image-side surface S7 of the third lens is a convex surface. The fourth lens L4 is a biconcave lens having negative refractive power, an object-side surface S7 of the fourth lens is a concave surface, and an image-side surface S8 of the fourth lens is a concave surface. The fifth lens L5 is a biconcave lens having negative refractive power, an object-side surface S9 of the fifth lens is a concave surface, and an image-side surface S10 of the fifth lens is a concave surface. The third lens L3 and the fourth lens L4 may be cemented to form a cemented lens.

The optical lens assembly may further include a diaphragm ST0, and the diaphragm ST0 may be disposed between the first lens L1 and the second lens L2 to improve imaging quality. For example, the diaphragm ST0 may be arranged close to the image-side surface S2 of the first lens L1.

In the present embodiment, both the object-side surface and the image-side surface of the first lens L1 and the fifth lens L5 may be aspheric.

Alternatively, the optical lens assembly may further include an optical filter L6 having an object-side surface S11 and an image-side surface S12 or a cover glass L6' (not shown). The optical filter L6 may be used to correct color deviations and the cover glass L6' may be used to protect an image sensor chip IMA located on an imaging plane. Light from an object sequentially passes through the respective surfaces S1 to S12 and is finally imaged on the image sensor chip IMA.

Table 39 shows the radius of curvature R, the thickness T, the refractive index Nd, and the abbe number Vd of each lens of the optical lens assembly of embodiment 16.

TABLE 39

| Surface number | Radius of curvature R (mm) | Thickness T (mm) | Refractive index Nd | Abbe number Vd |
|---|---|---|---|---|
| S1 | −13.5249 | 3.0000 | 1.64 | 34.49 |
| S2 | −19.8528 | −0.4026 | | |
| ST0 | Infinite | 3.5638 | | |
| S4 | 98.0000 | 6.5224 | 1.62 | 63.41 |
| S5 | −10.8619 | 0.3316 | | |
| S6 | 11.2539 | 3.6102 | 1.62 | 63.41 |
| S7 | −28.5534 | 2.7202 | 1.67 | 32.18 |
| S8 | 9.2777 | 2.8198 | | |
| S9 | −78.7325 | 4.4697 | 1.73 | 28.32 |
| S10 | 39.4192 | 0.6489 | | |
| S11 | Infinite | 1.0500 | 1.52 | 64.21 |
| S12 | Infinite | 3.0857 | | |
| IMA | Infinite | | | |

Table 40 below shows the conic coefficient K and the high-order coefficients A, B, C, D and E applicable to aspheric surfaces S1, S2, S9 and S10 in embodiment 16.

TABLE 40

| Surface number | K | A | B | C | D | E |
|---|---|---|---|---|---|---|
| S1 | 1.6315 | 1.5814E−04 | 7.0835E−06 | −1.1385E−07 | 6.5318E−09 | −1.4427E−10 |
| S2 | −2.2306 | 2.4611E−04 | 6.6247E−06 | −1.5863E−08 | 3.7605E−09 | −5.5253E−11 |
| S9 | −100.0000 | −1.9172E−04 | 2.8561E−06 | −4.7182E−07 | 2.8999E−08 | −6.8492E−10 |
| S10 | −81.3945 | 3.4188E−04 | 3.8673E−06 | −5.2801E−07 | 3.8285E−08 | −8.7513E−10 |

In view of the above, Embodiments 12 to 16 respectively satisfy the relationships shown in Table 41 below. In Table 41, the units of TTL, F, BFL, D, H, T45, F1, F2, F3, F4, F34 are millimeter (mm), and the unit of FOV is degree (°).

TABLE 41

| Condition/Embodiment | 12 | 13 | 14 | 15 | 16 |
|---|---|---|---|---|---|
| D | 7.625 | 8.860 | 8.621 | 9.045 | 8.867 |
| H | 7.242 | 8.812 | 8.598 | 8.612 | 8.586 |
| FOV | 30 | 30 | 30 | 30 | 30 |
| TTL | 27.960 | 30.293 | 25.523 | 30.392 | 31.420 |
| F | 13.972 | 16.388 | 15.618 | 15.908 | 15.833 |
| BFL | 3.824 | 5.625 | 5.773 | 4.843 | 4.785 |
| TL | 24.135 | 24.668 | 19.750 | 25.550 | 26.635 |
| F1 | −155.829 | −176.132 | −1046.531 | −219.180 | −80.946 |
| F2 | 17.875 | 17.308 | 11.883 | 17.859 | 16.139 |
| F3 | 11.760 | 12.042 | −7.148 | 11.346 | 13.486 |
| F4 | −7.701 | −7.786 | 7.863 | −6.408 | −10.050 |
| F34 | −68.653 | −61.831 | 129.431 | −32.387 | −229.332 |
| F5 | 68.983 | −147.706 | −16.680 | 56.057 | −35.238 |
| R1 | −9.404 | −9.506 | −47.599 | −10.749 | −13.525 |
| R2 | −11.301 | −11.479 | −52.727 | −12.865 | −19.853 |
| d1 | 2.000 | 2.577 | 2.883 | 2.973 | 3.000 |
| R3 | / | / | / | / | / |
| R4 | 28.142 | 36.053 | 16.537 | −150.000 | 98.000 |
| R5 | −17.458 | −14.871 | −12.570 | −10.159 | −10.862 |
| T1x | / | / | / | / | / |
| T12 | 5.552 | 6.392 | 1.849 | 5.191 | 3.161 |
| T23 | 0.100 | 0.123 | 0.500 | 0.391 | 0.332 |
| T45 | 2.643 | 2.635 | 2.450 | 4.141 | 2.820 |
| SL | 20.408 | 21.324 | 20.791 | 22.228 | 25.259 |
| CT2 | 3.330 | 2.524 | 2.637 | 3.000 | 6.522 |
| Nd3 | 1.62 | 1.62 | 1.65 | 1.62 | 1.62 |
| Nd4 | 1.67 | 1.67 | 1.72 | 1.67 | 1.67 |
| Vd4 | 32.18 | 32.18 | 47.92 | 32.18 | 32.18 |
| Vd3 | 63.41 | 63.41 | 33.84 | 63.41 | 63.41 |
| ΣCT | 15.840 | 15.518 | 14.951 | 15.827 | 20.323 |
| DSR3 | 5.955 | 6.794 | 1.349 | 5.593 | 3.564 |
| D/H/FOV | 0.035 | 0.034 | 0.033 | 0.035 | 0.034 |
| TTL/F | 2.001 | 1.848 | 1.634 | 1.910 | 1.985 |
| T45/TTL | 0.095 | 0.087 | 0.096 | 0.136 | 0.090 |
| BFL/TL | 0.158 | 0.228 | 0.292 | 0.190 | 0.180 |
| BFL/TTL | 0.137 | 0.186 | 0.226 | 0.159 | 0.152 |
| max{dn/dm} 1~5 | 2.200 | 1.726 | 2.350 | 1.492 | 2.398 |
| max{dn/dm} 2~5 | 1.760 | 1.726 | 2.350 | 1.492 | 2.398 |
| |F3/F4| | 1.527 | 1.547 | 0.909 | 1.771 | 1.342 |
| |F4/F3| | 0.655 | 0.647 | 1.100 | 0.565 | 0.745 |
| |F34/F| | 4.914 | 3.773 | 8.288 | 2.036 | 14.485 |
| |F/F34| | 0.204 | 0.265 | 0.121 | 0.491 | 0.069 |
| (R2 + d1)/R1 | 0.989 | 0.936 | 1.047 | 0.920 | 1.246 |
| T23/TTL | 0.004 | 0.004 | 0.020 | 0.013 | 0.011 |
| F5/F | 4.937 | −9.013 | −1.068 | 3.524 | −2.226 |
| (R2 − R3)/(R2 + R3) | / | / | / | / | / |
| T1x/T12 | / | / | / | / | / |
| SL/TTL | 0.730 | 0.704 | 0.815 | 0.731 | 0.804 |
| CT2/T12 | 0.600 | 0.395 | 1.426 | 0.578 | 2.063 |
| Nd2 | 1.62 | 1.62 | 1.62 | 1.60 | 1.62 |
| F2/F | 1.279 | 1.056 | 0.761 | 1.123 | 1.019 |

TABLE 41-continued

| Condition/Embodiment | 12 | 13 | 14 | 15 | 16 |
|---|---|---|---|---|---|
| Nd3/Nd4 | 0.970 | 0.967 | 0.960 | 0.967 | 0.967 |
| Vd4/Vd3 | 0.508 | 0.508 | 1.416 | 0.508 | 0.508 |
| ΣCT/TTL | 0.567 | 0.512 | 0.586 | 0.521 | 0.647 |
| F3/F | 0.842 | 0.735 | −0.458 | 0.713 | 0.852 |
| TTL/H/FOV | 0.129 | 0.115 | 0.099 | 0.118 | 0.122 |
| (FOV × F)/H | 57.878 | 55.793 | 54.492 | 55.417 | 55.320 |
| T23/TTL | 0.004 | 0.004 | 0.020 | 0.013 | 0.011 |
| F/H | 1.929 | 1.860 | 1.816 | 1.847 | 1.844 |
| DSR3/T12 | 1.073 | 1.063 | 0.730 | 1.078 | 1.127 |
| |F1/F| | 11.153 | 10.747 | 67.010 | 13.778 | 5.113 |
| |F1/F2| | 8.718 | 10.177 | 88.066 | 12.273 | 5.015 |
| |(R4 − R5)/(R4 + R5)| | 4.268 | 2.404 | 7.337 | 0.873 | 1.249 |
| |R1/R2| | 0.832 | 0.828 | 0.903 | 0.836 | 0.681 |
| T12/TTL | 0.199 | 0.211 | 0.072 | 0.171 | 0.101 |

The present disclosure further provides an imaging device, which may include the optical lens assembly according to the above-mentioned embodiments of the present disclosure and an imaging element for converting an optical image formed by the optical lens assembly into an electrical signal. The imaging element may be a photosensitive Charge-Coupled Device (CCD) or a Complementary Metal-Oxide Semiconductor (CMOS). The imaging device may be an independent imaging device such as a detection range camera, or an imaging module integrated on the detection range device.

The foregoing is only a description of the some embodiments of the present disclosure and the applied technical principles. It should be appreciated by those skilled in the art that the inventive scope of the present disclosure is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to), technical features with similar functions.

What is claimed is:

1. An optical lens assembly, from an object side to an image side along an optical axis sequentially comprising: a first lens, a second lens, a third lens, a fourth lens and a fifth lens, wherein the first lens has refractive power and is a meniscus lens;
the second lens has positive refractive power, and an image-side surface thereof is convex;
the third lens has refractive power;
the fourth lens has refractive power; and
the fifth lens has refractive power, and the fifth lens is a meniscus lens or the fifth lens is a biconcave lens;
wherein the third and fourth lenses are formed by a biconvex lens and a biconcave lens,
wherein a total effective focal length F of the optical lens assembly and an image height 2H corresponding to a maximum field-of-view of the optical lens assembly satisfy: F/2H≥1.5;
a total track length TTL of the optical lens assembly and the total effective focal length F of the optical lens assembly satisfy: TTL/F≤2.072;
a maximum field-of-view FOV of the optical lens assembly, the total effective focal length F of the optical lens assembly, and the image height 2H corresponding to the maximum field-of-view of the optical lens assembly satisfy: (FOV×F)/2H≤65°; and
a distance T45 from an image-side surface of the fourth lens to an object-side surface of the fifth lens on the optical axis and the total track length TTL of the optical lens assembly satisfy:

0.022≤$T45/TTL$≤0.6.

2. The optical lens assembly according to claim 1, wherein the third lens and the fourth lens are cemented to form a cemented lens.

3. The optical lens assembly according to claim 1, wherein the total effective focal length F of the optical lens assembly and the image height 2H corresponding to the maximum field-of-view of the optical lens assembly satisfy:

1.5≤$F/2H$≤1.929.

4. The optical lens assembly according to claim 1, wherein the maximum field-of-view FOV of the optical lens assembly, the total effective focal length F of the optical lens assembly, and the image height 2H corresponding to the maximum field-of-view of the optical lens assembly satisfy:

54.492°≤$(FOV \times F)/2H$≤65°.

5. The optical lens assembly according to claim 1, wherein the lens assembly further comprises an additional lens having negative refractive power, an object-side surface of the additional lens is convex, an image-side surface of the additional lens is a concave surface, and the additional lens is arranged between the first lens and the second lens.

6. The optical lens assembly according to claim 1, wherein at least one of the first lens, second lens or the fifth lens is an aspheric lens.

7. The optical lens assembly according to claim 1, wherein the optical lens assembly satisfies:

$D/2H/FOV$≤0.10/degree, or 0.03/degree≤$D/2H/FOV$≤0.05/degree, wherein FOV is the maximum field-of-view of the optical lens assembly, D is a maximum effective aperture diameter of an object-side surface of the first lens corresponding to the maximum field-of-view of the optical lens assembly, 2H is the image height corresponding to the maximum field-of-view of the optical lens assembly.

8. The optical lens assembly according to claim 1, wherein the optical lens assembly further satisfies: 1.554≤$TTL/F$≤2.072.

9. The optical lens assembly according to claim 1, wherein the optical lens assembly satisfies:

$BFL/TTL$≥0.10, or 0.226≥$BFL/TTL$≥0.10, wherein BFL is a distance from an image-side surface of the fifth lens to an imaging plane of the optical lens assembly on the optical axis, TTL is a distance from an object-side surface of the first lens to the imaging plane of the optical lens assembly on the optical axis.

10. The optical lens assembly according to claim 1, wherein a center thickness dn (n=1, 2, 3, 4, 5) of any of the first lens to the fifth lens and a center thickness dm (m=1, 2, 3, 4, 5) of any of the first lens to the fifth lens satisfy: max {dn/dm}≤3.5, or 1.492≤ max {dn/dm}≤3.5.

11. The optical lens assembly according to claim 1, wherein the optical lens assembly satisfies:

$TTL/2H/FOV$≤0.30/degree, or 0.089/degree≤$TTL/2H/FOV$≤0.20/degree, or 0.089/degree≤$TTL/2H/FOV$≤0.129/degree, wherein FOV is the maximum field-of-view of the optical lens assembly, 2H is the image height corresponding to the maximum field-of-view of the optical lens assembly, TTL is a total track length of the optical lens assembly.

12. The optical lens assembly according to claim 1, wherein the maximum field-of-view FOV of the optical lens assembly, the total effective focal length F of the optical lens assembly, and the image height 2H corresponding to the maximum field-of-view of the optical lens assembly satisfy:

$$54.492° \leq (FOV \times F)/2H \leq 60°.$$

13. The optical lens assembly according to claim 1, wherein the total effective focal length F of the optical lens assembly and the image height 2H corresponding to the maximum field-of-view of the optical lens assembly satisfy:

$$1.783 \leq F/2H \leq 1.929.$$

14. The optical lens assembly according to claim 1, wherein the optical lens assembly satisfies:

$$0.2 \leq |F34/F|,$$

wherein F34 is a combined focal length of the third lens and the fourth lens, and F is the total effective focal length F of the optical lens assembly.

15. The optical lens assembly according to claim 1, wherein a center radius of curvature r1 of an object-side surface of the first lens, a center radius of curvature r2 of the image-side surface of the first lens, and a center thickness d1 of the first lens satisfy: $0.5 \leq |(r2+d1)/r1| \leq 1.622$.

16. The optical lens assembly according to claim 1, wherein the optical lens assembly satisfies:

$$0.512 \leq \Sigma CT/TTL \leq 0.67,$$

wherein $\Sigma CT$ is a sum of the center thicknesses of all lenses on the optical axis of the optical lens assembly, and TTL is a total track length of the optical lens assembly.

17. The optical lens assembly according to claim 1, wherein the optical lens assembly satisfies:

$$T12/TTL \leq 0.33,$$

wherein T12 is a distance from the image-side surface of the first lens to the object-side surface of the second lens on the optical axis, and TTL is a total track length of the optical lens assembly.

18. The optical lens assembly according to claim 1, wherein the optical lens assembly satisfies:

$$0.022 \leq T45/TTL \leq 0.2.$$

19. The optical lens assembly according to claim 1, wherein the optical lens assembly satisfies:

$$0.5 \leq F2/F,$$

wherein F2 is an effective focal length of the second lens, and F is the total effective focal length F of the optical lens assembly.

20. An electronic device, wherein the electronic device comprises an optical lens assembly of claim 1 and an imaging element for converting an optical image formed by the optical lens assembly into an electrical signal.

* * * * *